US007313810B1

(12) United States Patent
Bell et al.

(10) Patent No.: US 7,313,810 B1
(45) Date of Patent: Dec. 25, 2007

(54) MULTIMEDIA INFORMATION TRANSMISSION AND DISTRIBUTION SYSTEM

(75) Inventors: Jackie Michael Bell, Marietta, GA (US); Mark R. McKeen, Acworth, GA (US)

(73) Assignee: The Weather Channel, Atlanta, GA (US)

( * ) Notice: Subject to any disclaimer, the term of this patent is extended or adjusted under 35 U.S.C. 154(b) by 0 days.

(21) Appl. No.: 09/269,454

(22) PCT Filed: Sep. 25, 1997

(86) PCT No.: PCT/US97/17412

§ 371 (c)(1),
(2), (4) Date: Mar. 26, 1999

(87) PCT Pub. No.: WO98/15122

PCT Pub. Date: Apr. 9, 1998

(51) Int. Cl.
*H04N 7/173* (2006.01)
(52) U.S. Cl. .................. 725/116; 725/105; 725/109; 725/114
(58) Field of Classification Search ............... 725/109, 725/105, 114, 116, 96–97
See application file for complete search history.

(56) References Cited

U.S. PATENT DOCUMENTS

| | | | | |
|---|---|---|---|---|
| 4,329,675 A | 5/1982 | Van Hulle | .................. | 359/97 |
| 4,704,725 A | 11/1987 | Harvey | ............................ | 380/9 |
| 4,734,764 A | 3/1988 | Pocock et al. | ................. | 358/86 |
| 4,814,883 A | 3/1989 | Perine et al. | ................ | 358/181 |
| 4,916,539 A | 4/1990 | Galumbeck | ................. | 358/142 |
| 4,924,303 A | 5/1990 | Brandon et al. | .............. | 358/86 |
| 4,941,040 A | 7/1990 | Pocock et al. | ................ | 358/86 |
| 5,099,319 A | 3/1992 | Esch et al. | .................... | 358/86 |
| 5,113,496 A | 5/1992 | McCalley et al. | .......... | 395/200 |
| 5,140,419 A | 8/1992 | Galumbeck et al. | ......... | 358/142 |
| 5,168,353 A | 12/1992 | Walker et al. | ................ | 358/86 |
| 5,182,640 A | 1/1993 | Takano | ........................ | 358/86 |
| 5,216,515 A | 6/1993 | Steele et al. | ................ | 358/335 |
| 5,311,423 A | 5/1994 | Clark | .......................... | 358/401 |
| 5,345,594 A | 9/1994 | Tsuda | .......................... | 455/18 |
| 5,359,367 A | 10/1994 | Stockill | ..................... | 348/552 |

(Continued)

FOREIGN PATENT DOCUMENTS

EP          0 132 382 B1          1/1985

(Continued)

OTHER PUBLICATIONS

Huntley, David M., All News Channel to Premiere Nov. 30 at 5pm, Communications Daily, Dec. 1, 1989.*

*Primary Examiner*—Hunter B. Lonsberry
(74) *Attorney, Agent, or Firm*—Kilpatrick Stockton LLP

(57) ABSTRACT

A communication system having programmable, addressable receivers that receive, store, process, and send digital and conventional video, audio and control signals for use in, among other things, a cable video network (9). Conventional audio and composite video and digital data signals are assembled into a single transmission by an automated production system. The transmission is delivered to the addressable receivers where the audio and video signals and some portion of the data may be selected and processed for re-transmission (114, 116, 118, 120, 98). The receivers may be addressed individually, in units or in groups for the purpose of receiving information on the basis of one or more pre-selected criteria.

2 Claims, 33 Drawing Sheets

U.S. PATENT DOCUMENTS

| | | | |
|---|---|---|---|
| 5,412,416 A | 5/1995 | Nemirofsky | 348/10 |
| 5,424,770 A | 6/1995 | Schmelzer et al. | 348/9 |
| 5,432,542 A | 7/1995 | Thibadeau et al. | 348/6 |
| 5,446,919 A | 8/1995 | Wilkins | 455/6.2 |
| 5,469,207 A | 11/1995 | Chambers | 348/9 |
| 5,499,046 A | 3/1996 | Schiller et al. | 348/6 |
| 5,535,229 A | 7/1996 | Hain, Jr. et al. | 371/53 |
| 5,539,451 A | 7/1996 | Carey et al. | 348/12 |
| 5,594,490 A | 1/1997 | Dawson et al. | 348/6 |
| 5,594,936 A | 1/1997 | Rebec et al. | 455/3.2 |
| 5,600,366 A | 2/1997 | Schulman | 348/9 |
| 5,600,573 A * | 2/1997 | Hendricks et al. | 725/109 |
| 5,608,732 A | 3/1997 | Bestler et al. | 370/474 |
| 5,790,935 A * | 8/1998 | Payton | 725/91 |
| 5,892,535 A | 4/1999 | Allen et al. | |
| 5,929,849 A | 7/1999 | Kikinis | |
| 5,940,776 A * | 8/1999 | Baron et al. | 702/4 |
| 5,983,005 A | 11/1999 | Monteiro et al. | |
| 6,075,551 A * | 6/2000 | Berezowski et al. | 725/36 |
| 6,204,851 B1 | 3/2001 | Netschke et al. | |
| 6,236,657 B1 * | 5/2001 | Andersson et al. | 370/400 |
| 6,285,373 B1 | 9/2001 | Baldwin et al. | |
| 6,347,216 B1 | 2/2002 | Marko et al. | |
| 6,370,571 B1 | 4/2002 | Medin | |
| 6,459,427 B1 | 10/2002 | Mao et al. | |
| 6,539,548 B1 * | 3/2003 | Hendricks et al. | 725/109 |
| 6,658,062 B1 | 12/2003 | Nakatsuyama | |
| 6,732,179 B1 | 5/2004 | Brown et al. | |
| 6,760,916 B2 | 7/2004 | Holtz et al. | |
| 6,792,615 B1 | 9/2004 | Rowe et al. | |
| 6,799,326 B2 | 9/2004 | Boylan et al. | |
| 6,952,221 B1 | 10/2005 | Holtz et al. | |
| 2002/0007493 A1 | 1/2002 | Butler et al. | |
| 2005/0166224 A1 | 7/2005 | Ficco | |

FOREIGN PATENT DOCUMENTS

| | | |
|---|---|---|
| EP | 0 148 733 A1 | 7/1985 |
| EP | 0 288 152 B1 | 10/1988 |
| EP | 0 288 890 A2 | 11/1988 |
| EP | 0 339 675 B1 | 11/1989 |
| EP | 0 382 764 B1 | 8/1990 |
| EP | 0 396 062 A2 | 11/1990 |
| EP | 0 668 699 A2 | 2/1995 |
| EP | 0 719 482 B1 | 7/1996 |
| GB | 2 174 874 | 11/1986 |
| WO | WO91/05436 | 4/1991 |
| WO | WO94/14280 | 6/1994 |
| WO | WO95/08226 | 3/1995 |
| WO | WO95/11569 | 4/1995 |

* cited by examiner

Design Maps - Packet Class

Packet Class Definitions

Data Base Abstraction Class Definitions

Figure 3 – Dynamic Inventory Record Diagram

| Field Name | Start | Length | Type | Use |
|---|---|---|---|---|
| Physical Record Number | 0 | 8 | long | The Physical Record Number |
| ItemID | 8 | 30 | string | The Items ID (inventory number) |
| Sequence Number | 38 | 4 | byte | The segment number of the continued record |
| Data | 42 | 20 | string | The data |

Table 1 – Field Descriptions

| Data Type | Description |
|---|---|
| Configuration | Data representing a configuration item like the WXL serial or IP Address. |
| Inventory | Data describing hardware and software components associated with the WXL like number of hard disks, amount of memory etc.. etc. |
| Interest | Data indicating the WXL's interest. Each WXL receives all data broadcast by the WXL Host. The WXL "looks" at the address of this data to "see" if it is interested in it. If it finds a match in the DIF Interest Records it "knows" to grab the data contained in the packet. |
| Weather Tabular | Tabular weather data |
| Weather Narrative | Narrative weather data |
| Programs | Programs that can be run remotely. |
| Presentation Products | Scripts and templates associated with products. |
| Presentation Inventory | Icons, Bitmaps, weather maps, and other graphics. |

FIG. 29

| Command | Format | Description |
|---|---|---|
| RECEIVE | CALL RECEIVE "filename", "packets" | Receives an externally stored file specified in "filename" which will be transmitted in "packets" number of packets. |
| RELOAD | RELOAD "app" | Reloads PAL/PE presumably after these programs have been updated. |
| RESET | CALL RESET | Resets the machine. The operating system will be reloaded. |

FIG. 30

| Command | Format | Description |
|---|---|---|
| LOAD | CALL LOAD product | Loads the product named in the "product" parameter |
| RUN | CALL RUN | Runs the product currently loaded. |
| PASSTHRU | CALL PASSTHRU command | Passes the presentation manager specific instruction in the "command" parameter to the presentation manager. |
| STOP | CALL STOP | Stops the current product execution. |

FIG. 31

MULTIMEDIA INFORMATION TRANSMISSION AND DISTRIBUTION SYSTEM

BACKGROUND OF THE INVENTION

This invention relates to a system for the transmission of audio and combined video, data, multimedia programming and control signals to remote receiving locations for distribution under the command of the control signals. Transmission of audio and video signals to local receiving stations for immediate use, re-transmission or recordation for later transmission is a well-established practice, particularly in connection with distribution of television programming by various television networks and cable systems. Utilization of data to generate characters which are displayed on a video screen over a single color background or another video signal background is also established practice.

These practices have been combined with new technologies to create for viewers what appears to be continuous programming, but is really a sophisticated stream of many types of segments, or products, originating from different places. For instance, U.S. Pat. No. 4,725,886 to Galumbeck and related U.S. Pat. Nos. 4,916,539 to Galumbeck and 5,140,419 to Galumbeck, which are incorporated herein in their entireties by this reference, disclose current communications systems utilizing novel hardware and software configurations to transmit conventional video and audio program material together with data and control commands within the constraints of conventional television signal specifications to remote signal processors or receivers within the system. The remote signal processors or receivers receive the entire transmission and process it in a predetermined manner such that the data and the conventional video and audio signals may be utilized at the remote receivers, under network control, particularly for transmission on local cable television systems.

This technology may be applied to any system for distributing information and is not limited to weather related information; however, the application of this technology may best be understood by analyzing the operation of an existing system such as The Weather Channel (TWC). TWC is an automated system for distributing and delivering weather related information, or "products" over broad areas.

The main classes of current TWC information are local weather segments, national weather segments and advertisements. All are presented in different ways and at different times, creating a multiplicity of products. These products vary in sophistication. For example, a product may be a relatively simple banner of text running across the bottom of a screen; a nationwide weather presentation by an On-Camera Meteorologist (OCM) with the help of satellite animation; or a multiframe radar map overlay sequences provided in data form to the cable headend and processed there for display to local viewers overlaid on a geographic map to show, for instance, movement of a storm system.

As illustrated in FIG. 1, at any time during the TWC programming day, there are two types of information which must be prepared at the TWC central facility and transmitted to the cable company for presentation of TWC programming: the national transmission 10, which is seen by all cable subscribers; and the local transmission 16, which is seen by viewers in selected corresponding cable markets. National transmission 10 is transmitted as a traditional audio/visual (A/V) signal originating at TWC headquarters 12 in Atlanta, Ga. The same signal carries (via subcarrier) local transmission 16, which is transmitted to the cable operator as data representing local weather information, advertising information and commands that instruct the cable headend, or receiving unit 14, on how to display the information. Receiving unit 14 periodically produces its own programming using the data sent by TWC. Receiving unit 14 passes national transmission 10 through during its time slot; however, during the time for the local transmission 16, locally-created graphics and programming (generated with data received from TWC) from receiving unit 14 are interposed.

The conventional TWC distribution system for local weather data can be thought of generally as a one-way client/server architecture, where raw data and A/V are sent to receiving unit 14. Receiving unit 14 then assembles the data for display (local transmission 16) or passes through the A/V signal (national transmission 10), depending on the instructions sent by TWC headquarters 12.

As illustrated in FIG. 2, three sources of information are drawn upon to create national transmission 10 and local transmission 16: weather data 18, affiliate database 20, and programming/scheduling 22. These sources are drawn upon by many subsystems to form the final programming seen by the cable subscriber.

The first source of information is data and graphics accumulated for weather forecasts from external sources and is collected in a system called the meteorology system 24, illustrated in FIG. 3. Not all information is passed from Meteorology system 24. Meteorology system 24 filters information as dictated by a local database called the meteorology system interest list.

Weather data 18 is collected by the National Weather Service (NWS) 26. NWS 26 has weather collection sites throughout the United States at airports, military bases, and other selected sites. These sites report each hour during their scheduled reporting time, which varies from six to twenty-four hours depending on requirements. Some sites are automated, while others are manual, with information being collected and presented either by machine or by personnel at the site.

A third party provider 28, disseminates that information to TWC in tabular and narrative form. Tabular data 30 is presented in fixed-length records with fixed-length fields or specific weather conditions. Character fields are typically left-justified and either maximum length or null-terminated. Numeric fields are either binary or right-justified with leading spaces. For example:

| Location | Temp | Description | Etc. |
|---|---|---|---|
| ATL | 75 | SUNNY | ETC. |

This information arrives at any time and typically includes information such as the temperature, wind speed, humidity and other weather related information for a particular location.

Other information provided by the weather reporting agencies includes weather warnings and advisories, which are provided as narrative data 32 in free-form text as variable length strings. Radar maps 34 are provided by the National Oceanic and Atmospheric Administration (NOAA) in run-length encoded form and are converted into a composite and sent to the field every fifteen minutes. Backup system 36 is provided in the event data cannot be received from TWC.

Referring to FIG. 2, to correctly route the information, affiliate database 20 stores the location and address of the cable operator (or the cable operator's equipment in cases where there may be multiple headends installed). Affiliate database 20 contains information needed to transmit weather data to cable operators. Much of the information focuses on reconciling a cable operator's zip code with their geographical longitude and latitude. This allows the information to be addressed to an appropriate location, so that, for instance, weather information relevant to Miami will be directed to the Miami receiving unit. This also allows tags and copy splits to be directed to the desired location. Tags are billboards appearing at the end of a commercial. They display the name and address of the local operator of a national company. For example, a Michelin Tire commercial could list the names of the local dealers. A copy split could include different commercials for different areas of the country.

Programming 22 includes information, advertisements, program direction, and camera assignments. Production is fully automated: cameras, sets, commercials, and weather data are presented on a predetermined schedule. OCM segments and other live action A/V are produced in an automated studio where the operation of cameras and other production equipment are controlled by an automated production engine 38. Production engine 38 creates and coordinates the live A/V transmission and command data feed.

FIG. 4 illustrates how information for this programming is directed into production engine 38. Entry of programming information to the system begins with the sale of commercial advertisements and sponsorships of programming. Sales proposal system 40 identifies and tracks potential customers. Also, sales are proposed and secured with contracts. Commercial contracts are entered into traffic system 42 by department personnel. Traffic system 42 classifies the terms of the contract. An advertisement schedule is then transferred to traffic system 42. Traffic system 42 also contains the programming schedule for TWC and, as such, the first draft for a programming day is developed there. In addition, traffic system 42 is the main scheduler, where the script is written for the programming day, including advertisements and schedules for national 10 and local 16 transmissions. A video tape of the commercial is loaded into a large videotape tower carousel 44, such as an Odetics. The stored commercials are then played according to a schedule log.

The Source Book program on computer 46 converts the commercial schedule from traffic system 42 into the schedule log. It coordinates the schedule with the computer commands to be sent to all equipment involved in the transmission period. Once compiled, this file is transferred from computer 46 to production engine 38 and tape carousel 44. Technical Directors at the production engine Edit Station perform any necessary real-time modifications.

The Source Book program produces OCM Guide Sheets 48. It produces hard copies of the schedule log specifically for the OCMs. This log then becomes the production script for live weather transmissions.

Referring to FIG. 2, production engine 38 also directs command data 50 to host 52. Weather data 18 and affiliate data 21 are combined with command data 50 to create the final command transmission 53 (provided by host 52), and a live A/V transmission 54 is created simultaneously. Next, command transmission 53 and the live transmission 54 are combined into one transmission 56. Transmission 56 is beamed via satellite to most of the cable operators in the US. Transmission 56 is captured by a satellite dish, decrypted by conventional decryption means such as General Instruments Videocypher II equipment and broken into its component parts—command data and video—and then sent to receiving unit 14.

Receiving unit 14 uses the information carried in the signal to produce the presentation seen by viewers and to pass-through audio and video. To accomplish this task, receiving unit 14 receives the national transmission 10 and a stream of command, advertising and weather data. When receiving unit 14 is instructed to pass-through national transmission 10, it directs the video signal, i.e., the national transmission, from the TWC to the cable operator's network, where it is seen by viewers. When instructed to show the local transmission 16, receiving unit 10 combines data and onboard graphics to produce local transmission 16. The pass-through of national transmission 10 is then interrupted and local transmission 16 is forwarded to the cable operator's network, where it is seen by viewers. Receiving unit 14 is capable of building graphics by running a custom scripting language. It can perform color shifts and simple radar map animations. The end result is that the cable subscriber receives programs formed of segments of national 10 and local 16 transmissions.

Referring to FIG. 5, one of the most important aspects of the current TWC system is the relationship between receiving unit 14 and host 52. Host 52 communicates with receiving unit 14 by sending commands. The commands either configure receiving units 14 or prepare and execute local transmission 16 (including programming such as advertising information).

There are two lines of communications between production engine 38 and host 52. First, there is a data communications line 58 between host 52 and production engine 38. As previously mentioned, production engine 38 produces the program day's schedule in its final form. Data line 58 sends an event list and ensures that production engine 38 and host 52 are synchronized. The second form of communications is the Take Line. This is a binary switch (5 volts=on, −5 volts=off) that instructs host 52 to initiate the next event.

In general, local weather is transmitted several times each hour; however, weather warnings or remote reports may be scheduled in an ad-hoc manner. Thus, the TWC system must be able to respond accordingly. In order to produce the desired programming, receiving units 14 typically respond to at least three command sets: cyclic, load and run. The task with the lowest priority is the cyclic command, which runs during each hour and sends all the configuration data needed to re-initialize receiving units 14. The cyclic command set is intended to refresh a receiving unit 14 that has lost power or been replaced. The cyclic command set is important because no current receiving unit 14 has any significant amount of permanent storage capability. The only storage provided consists of random access memory (RAM), backed up by a battery power supply. If the batteries fail, the configuration information is lost.

Another important command sent to receiving units 14 is the load command set. The load command set warns receiving units 14 of an impending local transmission 16. This allows time for loading the presentation into memory to eliminate delays in the transition from national 16 to local 10 transmissions.

After the load command set has been executed, the run command set is sent. This causes receiving units 14 to cut off national transmission 10 and begin local transmission 16. Three components of the run command set are: sensors, commercials and tags. The sensor component instructs those receiving units 14 that have weather sensing equipment attached to read those devices. The commercial component allows receiving units 14 to run local commercials. Upon receiving the run command, receiving units 14 signal local video equipment to run and turn off national transmission 10. The tag command instructs the receiving units 14 to produce a text output over or after a national commercial, thereby advertising local outlets.

Of course, these systems can be used to create all forms of programming and are not limited to weather-related information. For instance, educational, sports, entertainment, business, product marketing and other forms of information can be distributed in this manner. Furthermore, this system may be used to distribute information over media other than televisions, for instance, home computers. Nonetheless, these systems have several limitations which limit the quality and character of programming that may be displayed to the viewer and the flexibility with which product can be distributed on a national and local level.

In particular, bandwidth availability may limit the volume of information which may be transmitted to the various receiving units. Although compression technology has significantly expanded the amount of information that may be transmitted over a given channel, consumer demand for more information and increasing sophistication of multimedia products has caused even greater growth in the total volume of information which must be transmitted to create the ultimate program received by the viewer. One solution is simply to increase the number of channels used to transmit the information; however, rapid expansion in the number of content providers has limited the availability of additional channels (as well as increasing the cost of existing channels). This problem affects not only conventional communications channels, such as satellite transmission, but also more recently available channels, such as the Internet. Thus, it is desirable to limit the bandwidth required to transmit a given set of information by providing a system which coordinates the transmission of information in its various forms, i.e., analog and digital video and audio, data, etc. to maximize the utilization of the available channels and therefor the through-put.

The hierarchical addressing system as taught in the Galumbeck patents can limit the flexibility of product distribution over discrete areas. This is because the current scheme requires that a separate message be sent to each receiving unit unless the message is common to all of the receiving units within a given tier of the hierarchy. For example, a single message cannot be sent to only the receiving units in Miami and Los Angeles unless it is desired that all other receiving units within the same tier display that same message. If the message is only intended for Miami and Los Angeles, two separate messages must be sent. Due to the limited availability of bandwidth and transmission channels, the total number of messages being sent over a given period may be limited, often making it difficult or impossible to send individual messages to discrete receiving units.

Nonetheless, it may be desirable to send messages to individual receiving units based on non-hierarchical criteria. The current hierarchical structure is based on geographical boundaries, which is consistent with the needs of displaying weather data; however, other criteria for distributing information may be envisioned. For instance, it may be desirable to target distribution based on demographics for advertising purposes, e.g., locations with high proportions of retirees or males 18-24, etc. Thus, it would be desirable to provide a system for sending a single message addressed to multiple receiving units on a non-hierarchical basis without necessarily incorporating other, undesired receiving units.

The current system distinctly segregates A/V transmission and data transmissions. The data transmissions are handled by the product server/host/receiving unit system (the "command data system") while the A/V transmissions are handled by the production system production engine 38 coordinates both signals to create the final sequence of products displayed to the viewer. It may be desirable to provide A/V data which can be displayed on the local rather than the national level; however, the current receiving unit does not have the capability of recording and replaying such large blocks of data. Furthermore, the command data system is not capable of producing and transmitting A/V data. Also, the production system is not capable of transmitting addressed data. Therefore it would be desirable to provide a system which can coordinate the transmission of an address through the command data system and the transmission of local A/V through the production system to a receiving unit capable of recording the local A/V and re-distributing it as is currently done with data.

The current receiving unit 14 may be accessed from the host via the transmission system as well as other means, including modems and the Internet; however, the multiplicity of communications protocols limits the flexibility of these communications. Also, it is difficult to coordinate multiple lines of communications to perform advanced functions such as monitoring of transmission reception via an Internet link. Thus it would be desirable to create an integrated communication system which allows the host to use a single interface regardless of the communications topology that is being used to communicate with the receiving unit.

The command data system comprises multiple hardware and software elements. Each of these elements must communicate effectively in order to ensure system functionality. As system complexity increases, however, it becomes increasingly difficult to maintain the integrity of inter-module communication, especially as particular elements are upgraded or replaced. Thus, it would be desirable to provide a standardized interface between the elements which allows data to be transmitted there between and allows an appropriate level of error checking to be used.

The current receiving unit can only perform limited manipulations of the data it receives. It would be desirable to provide a receiving unit which can perform advanced data manipulation. Performing more advanced manipulation requires a more sophisticated operating system and system diagnostics. Therefore an advanced receiving unit must also be capable of performing advanced housekeeping functions.

The current system relies on the production system and the meteorology system to provide the vast majority of products such as weather alerts and data formatting. This requires large amounts of data to be repeatedly transmitted. It would be desirable to provide the receiving unit with sufficient intelligence to perform much of the data formatting, such as plotting data on map-like representations and other advanced features such as identification of notable weather anomalies or patterns and independent product selection.

The current receiving unit presentation file is built and played at the same time, leaving these systems idle for most of the programming hour, then forcing them into a high state of utilization for the local weather transmission. Because the current receiving unit must "Build and Play" concurrently, it is limited by horsepower (as to the sophistication of its graphics) and by the desire to use the latest data. "Build and Play" is a requirement of these systems because of the lack of permanent storage limited their ability to build and store a play file. Thus, it would be desirable to provide a system that can store data and selectively retrieve and process that data in a manner that more effectively and efficiently uses the available resources, e.g., processor time, storage space, etc.

SUMMARY OF THE INVENTION

The present invention relates to a system which provides these desired functions and capabilities.

Addressing schemes according to the present invention allow more flexibility in programming individual receiving units. The information may be, for instance, segregated between individual receiving units in the following manner: Each receiving unit has an interest list which can be, for instance, a table of two columns, the first of which bears a field name and the second bearing a field value. Thus, a receiving unit in Cobb County, Ga. may have a field name of "state" and a field value of "Georgia," a field name of "county" and a field value of "Cobb," and so forth, for any variety of selection criteria that may be desired. The criteria need not be geographic. For instance, one criteria may be a field name of "demographic area 1" which represents an area with a high number of retirees. A field value of "1" or "0" indicates that that receiving unit is or is not a member of "demographic area 1." Thus, completely disparate receiving units in different regions may be "interested" in similar information due to factors other than geography.

At the transmission source, a product server formats the data, introducing an address which may be formatted in structured query language (SQL). For instance, a set of data may begin with the command "select receiving unit where County=Cobb." The next line of information begins "weather information equals" followed by a string of data. Each receiving unit looks at the incoming information and if the address data matches the interest list, in other words, if "county=Cobb," it then proceeds and reads the rest of the data and formats it for display. If it is not true, the information is simply disregarded.

This allows the system to be different from conventional systems in at least the following manner. The current system uses a hierarchical addressing scheme. In other words data may be delivered only to ever expanding unitary regions. Thus, data may be sent to the receiving unit in the City of Atlanta or all of the receiving units in Cobb County, Ga. which might include the receiving unit in the City of Atlanta or all of the receiving units in the State of Georgia which will include all of the receiving units in Cobb County and the City of Atlanta. It is impossible, however, to send a single message to be received by both a receiving unit in Atlanta and a receiving unit in San Francisco without the same message being received by all of the receiving units in the same common region, for instance, the United States.

It may be desirable, however, to address one message to separate receiving units in distinct geographical regions without capturing the smallest common region between those two points. For instance, it may be desirable to direct targeted programming to a particular demographic sample such as the elderly or the retired in the cities of Phoenix, Miami and Los Angeles. However to do so with the current system would require that three separate messages be sent, even though the data being sent is identical, in order to be addressed to those particular receiving units without including the intervening common region and all of the receiving units included therein. The addressing system of the invention allows a single message to be targeted to numerous disparate locations without capturing unwanted receiving units. Thus the addressing list for a piece of data targeted at receiving units with particular demographics may be accomplished simply by including that criteria on the receiving units' interest list and then addressing the information accordingly.

Both the current system and the new system transmit to the receiving units by means of a single transmission channel which carries multiple channels, e.g., four audio channels and one video channel. This video channel and one of the audio channels may be dedicated to the national programming. One of the audio channels provides the background music for data displays and one of the audio channels provides the command feed to the receiving units. The last audio channel provides digital command data. Other numbers and combinations of audio and video channels may be selected as appropriate.

Systems according to the invention have the ability to send local voice-over audio signals, that is, a narration for the local transmission. Also provided are local video downloads. In other words, instead of simply directing data to particular regions, audio and video may also be provided selectively to different regions. In order to do this, a portion of the satellite transponder system is taken and the modulation is narrowed to allow the addition of one or more sub-carriers. Alternatively, more transponders may be used, increasing total available bandwidth.

In order to provide the video and voice-over information to the receiving units, a master dynamic scheduler (MDS) may be provided. Addressing information for data and the data itself can thereby be sent over separate channels. In the current system, the national transmission is produced in the production system as controlled by the automation system and sent directly through the receiving unit to the viewer. The local transmission is created by the command data system and the data is sent to the receiving unit and stored, processed, and displayed periodically. The decision by each receiving unit to store particular data is based on the addressing information.

According to the invention, voice-over and video information can be produced in the studio, which may controlled by the automation system, forwarded to a storage system and periodically transmitted, under the control of the automation system, in digital compressed form to the receiving units. The form in which it is transmitted, however, is not addressed. Instead, addressing information is sent out from the host, which commands the receiving unit to, for example, "look at digital channel one and record information for the next 2 minutes." The MDS coordinates the automation system and the host so that the message instructing the receiving units when to begin recording comes at the proper time so that the data is not missed.

Thus, a video and voice-over intended for a particular locality, such as Miami, may be prepared. The host then sends a message addressed to the Miami receiving unit which tells it to look at the first digital transmission line and to store the next 2 minutes of data that is being fed through. At the same time, the automation system begins transmitting the video data. The MDS coordinates these two devices so that the timing is worked out. The MDS also knows to avoid conflicts. For instance, if the receiving unit cannot record video data and play back video data at the same time, the MDS knows at what times video is being played back by a particular receiving unit and avoids sending data to that particular receiving unit at that time. The MDS is aware of what each receiving unit is doing at any particular time and selects data from the transmission queue for delivery in a way that avoids functionality conflicts while optimizing the use and capacity of the delivery medium. An alternate embodiment includes recording the data in digital form and also providing it with an address. Another embodiment includes foregoing the digitization and compression of video data feeding it to the receiving unit in real time for immediate playback to the viewer.

Furthermore, use of the MDS allows the throughput of the transmission channel to be maximized. By prioritizing data, transmitting at appropriate times and identifying "downtime" in which to transmit low priority data, the transmission channel can be kept "full" at all times. This approach allows as much as possible of the channel bandwidth to be used before additional bandwidth must be secured. In other words, rather than rigidly scheduling transmission times, much of the information which is not real-time or high priority may be delayed until bandwidth becomes available. Additional bandwidth becomes necessary only when the entire channel is consumed over such long periods of time to make transmission delays impractical. This has the effect of dramatically increasing the total transmission capacity over a given period of time.

In order to effectively manage the data flow, however, the MDS must know the status of each and every receiving unit which it controls. Where a two way link is available, such as over the Internet, the MDS may simply query each receiving unit to determine its status (for example, this is necessary to avoid sending data to be recorded to a receiving unit when the unit is already playing back recorded data, since the recording and playback functions may conflict). When the only available link is one way, such as satellite transmission, the MDS must maintain a "mirror file," that is, a record of all information that has been delivered to each receiving unit. In this manner, the MDS knows the remaining storage capacity of each unit and its playback schedule, allowing data transmissions to be scheduled for maximum efficiency.

One limitation of the system is that the satellite link between the transmission facility and the receiving units only supports one way communication from the transmission facility to the receiving units. If this were the only link available, it would be impossible to monitor the receiving units and to conduct diagnostics to determine whether information was being properly delivered. Thus receiving units are equipped with additional ports for communications, such as RS232 ports for modem access and TCP/IP ports for Internet access. In this manner, the operator may contact each of the receiving units through these other means and have two way communications that allow diagnostics, monitoring and other tasks. Additionally, receiving units may receive transmissions over the Internet, but be serviced via a direct modem link.

One problem, however, is that three or more communications protocols may be necessary, each required to support one means of communications. One standard protocol is provided for satellite delivery to the receiving unit, a second for modeming to the receiving unit and yet another for Internet communications with the receiving unit, etc. Thus it would be desirable to provide a consistent interface to the user regardless of what topology is used to communicate with the receiving unit. This is accomplished by providing a TCP/IP overlay, which connects to the receiving unit. The "underbelly" of the overlay is a socket which connects to as many communication protocol "translators" as necessary to support the selected means of communications.

Similarly, each element of the system includes sophisticated software components. Each of these components must communicate effectively with the others so that the system can function properly. A system according to the invention provides software "plugs" which are standard interfaces between software components. These interfaces allow standardization of communication protocols between components. Furthermore, features, such as error checking, may be incorporated in the plug.

Receiving units according to the invention incorporate a software structure which includes three layers: command, hardware and presentation. The command layer accepts all data and determines whether the data is addressed to the particular receiving unit. If so, the data is either sent to the hardware layer, which is responsible for carrying out housekeeping tasks such as debugging and defragmentation, or to the presentation layer, which manipulates the data and prepares the product seen by the viewer. This modular approach allows for flexibility in programming and maintaining the receiving unit.

Receiving units according to the invention may have advanced capabilities for manipulating and formatting the data. Instead of simple graphics and static icons, many video effects, such as text scrolling, video fades, animated icons, screen squeezes, etc. are provided.

In a system according to the invention, for particular forms of information only certain data related to the product are actually transmitted. For instance, for radar maps, the basic information relating to the region to be displayed, e.g., a topographic map of the United States and an overlay map showing the geographical boundaries, are stored by the receiving unit. Additional overlay information showing the actual radar data is sent out over the system. The receiving unit is given information to know its own location by latitude and longitude. The receiving unit selects the portion of the map corresponding to its location and a predetermined surrounding area and displays only that portion of the map and its corresponding radar data.

Receiving units according to the invention may have a artificially intelligent program for scanning the weather data in making projections based thereon. For instance, the receiving unit may analyze the data used to construct a radar image and, if certain criteria are met, such as high intensity precipitation in conjunction with other factors, the receiving unit may issue a severe weather alert regardless of whether the National Weather Service has done so.

Likewise, receiving units according to the invention may intelligently "select" products. For instance, a receiving unit in a landlocked region knows to display an Almanac product instead of a Tides product. Similarly, receiving units according to the invention analyze incoming data and, based on selected criteria, generate new products which highlight significant aspects of the data. For instance, the receiving unit may analyze the incoming radar data to identify regions of high pixel intensity and density which would indicate severe weather. The receiving unit may then generate a weather advisory product for the affected area.

The receiving unit according to the invention also responds to a loss of signal by generating its own playlist and operating until the signal is recaptured.

Accordingly, it is an object of the present invention to provide a multimedia transmission and distribution system which increases the ability of each receiving unit to be highly customized on a localized basis.

Another object of the present invention is to provide a multimedia transmission and distribution system which maximizes information throughput over a given transmission channel thereby minimizing the number of channels necessary to deliver the product.

Another object of the present invention is to provide a multimedia transmission and distribution system which delinks the overall system from the receiving unit software—i.e., makes the software accommodate the spectrum of localization.

Another object of the present invention is to provide a multimedia transmission and distribution system which eliminates much of the time for dispatching configuration data so that more sophisticated and specialized data can be delivered in its place.

Another object of the present invention is to provide a multimedia transmission and distribution system which accommodates the current strategy of building a presentation from data and visual effects in a way that allows for more advanced pre-built presentations to be downloaded and displayed.

Another object of the present invention is to provide a multimedia transmission and distribution system which accommodates value-added "for-profit" services such as local advertising.

Another object of the present invention is to provide a multimedia transmission and distribution system which facilitates the use of off-the-shelf presentation products.

Another object of the present invention is to provide a multimedia transmission and distribution system which allows remote retrofit of presentation and housekeeping software.

Another object of the present invention is to provide a multimedia transmission and distribution system which allows a consistent communications interface between the host and the receiving unit regardless of the method of communication used.

Another object of the present invention is to provide a multimedia transmission and distribution system which has a non-hierarchical addressing system, i.e., that allows a single message to be delivered to multiple receiving units in different regions without capturing all receiving units the region common to the selected receiving units.

Another object of the present invention is to provide a multimedia transmission and distribution system which allows local, but un-addressed, data to be recorded and/or processed by selected receiving units.

Another object of the present invention is to provide a multimedia transmission and distribution system which includes software plugs between software modules to allow standardized intermodule communications and error checking.

Another object of the present invention is to provide a multimedia transmission and distribution system which allows presentation of data with state of the art graphics and video effects.

Another object of the present invention is to provide a multimedia transmission and distribution system which can intelligently plot data onto on-board graphic "base maps."

Another object of the present invention is to provide a multimedia transmission and distribution system which can independently interpret downloaded data and create new products based on the content of the data.

Another object of the present invention is to provide a multimedia transmission and distribution system which can independently select products based on local criteria.

Another object of the present invention is to provide a multimedia transmission and distribution system which can operate in the absence of command data or input signals.

Other objects, features, and advantages of the present invention will become apparent with reference to the remainder of the written portion and the drawings of this document.

BRIEF DESCRIPTION OF THE DRAWINGS

FIG. 11C is a structural object map illustrating the relationship between the components of and the flow of data through the host module of FIG. 11.

FIG. 11D illustrates the structure of a command message as utilized by the system of FIG. 11.

FIG. 11E is a structural object map illustrating the relationship between the components of and the flow of data through the queue server module of FIG. 11.

FIG. 11F is a structural object map illustrating the relationship between the components of and the flow of data through the command module of FIG. 11.

FIG. 11G is a structural object map illustrating the relationship between the components of and the flow of data through the de-queue module of FIG. 11.

FIG. 11H is a structural object map illustrating the relationship between the components of and the flow of data through the command abstraction layer of FIG. 11.

FIG. 29 illustrates the data types used by the system of FIG. 11.

FIG. 30 is a table of common application layer commands used by the system of FIG. 11.

FIG. 31 is a table of presentation engine layer commands used by the system of FIG. 11.

DETAILED DESCRIPTION OF THE INVENTION

Figure 7:
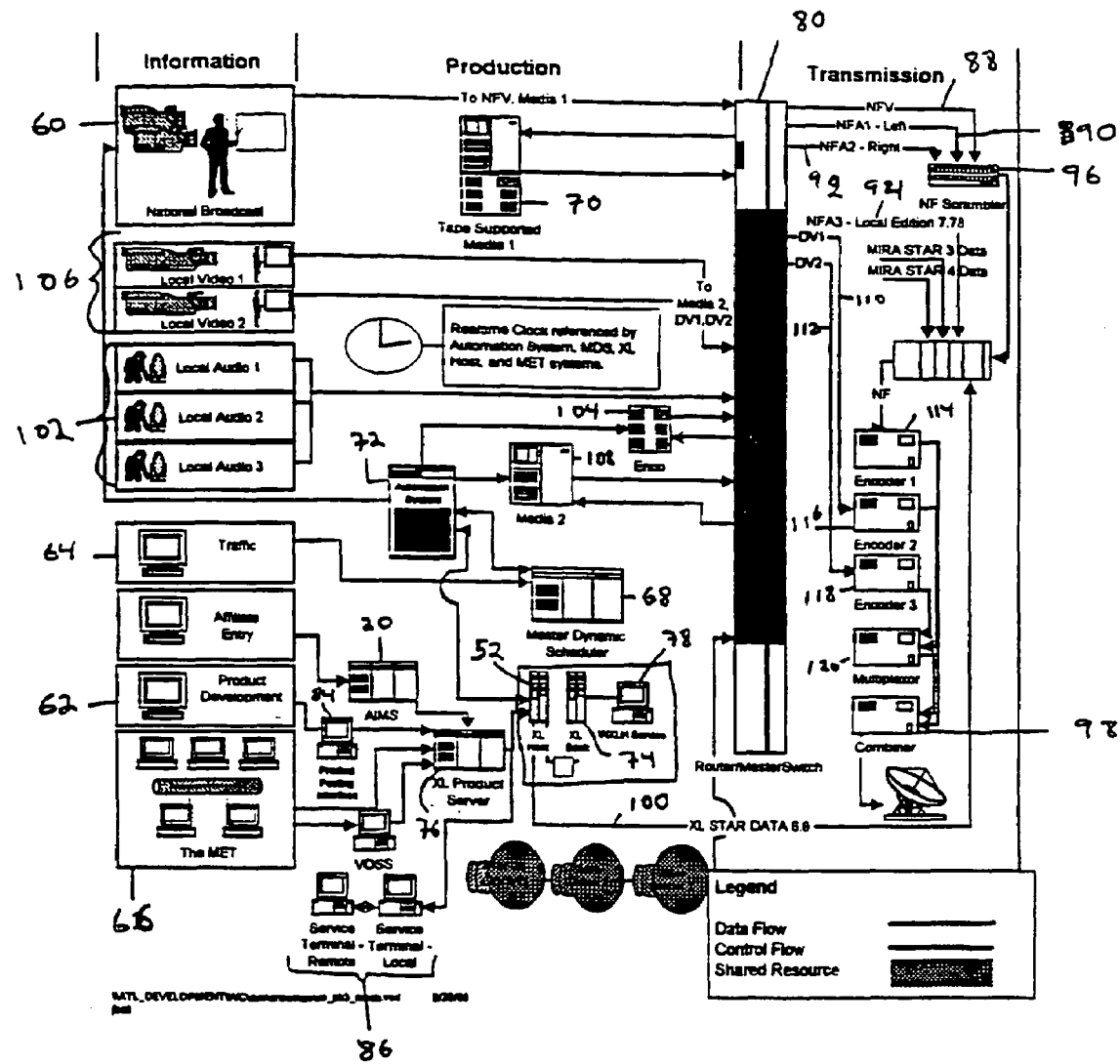
FIG. 7 illustrates the portion of a multimedia transmission and distribution system according to the present invention which is responsible for creating and distributing the programming.
Figure 8:
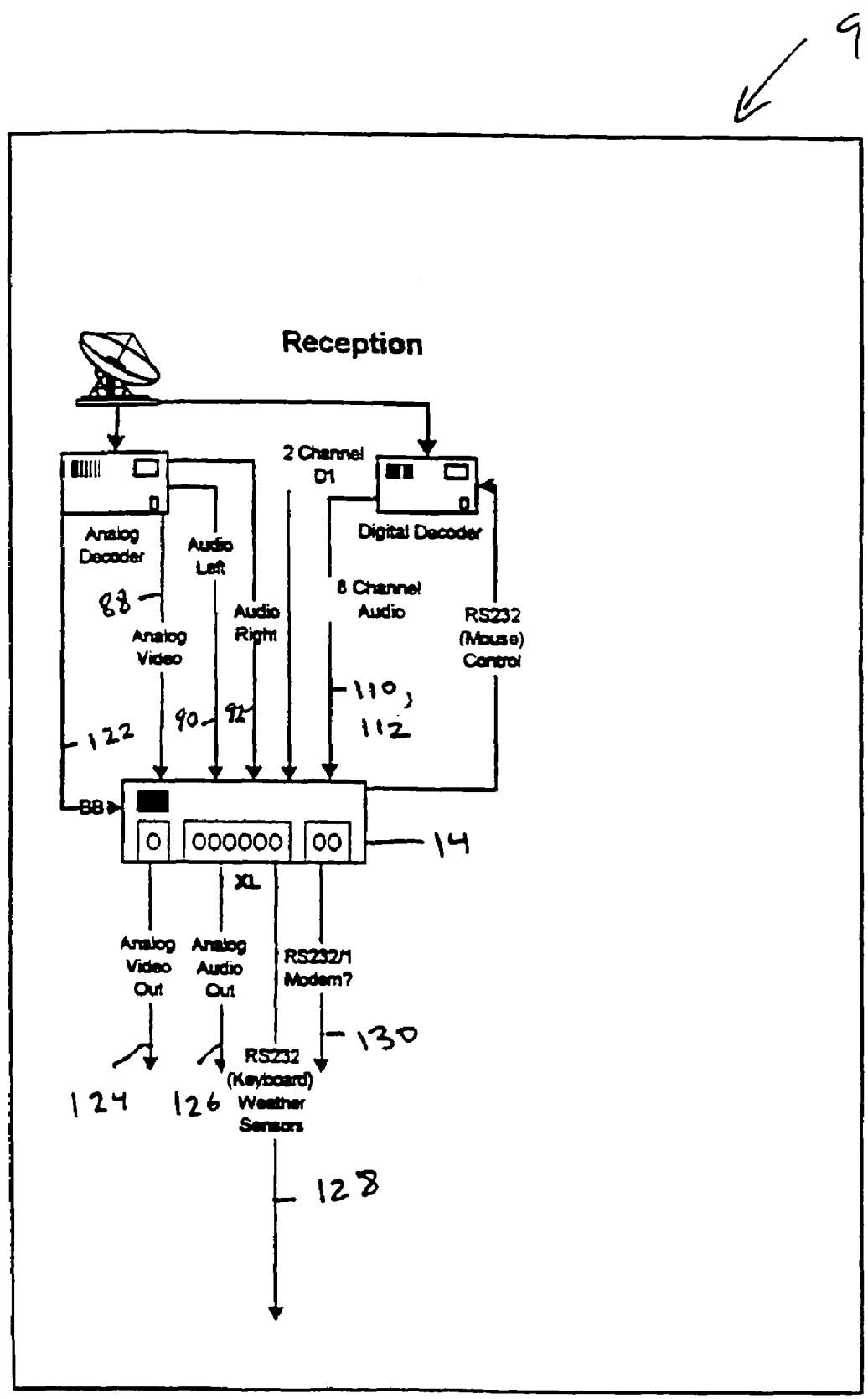
FIG. 8 illustrates the portion of the system of FIG. 7 which is responsible for receiving the programming.

FIGS. 7-8 schematically show a multimedia transmission and distribution system 9 consistent with the principles of the present invention. They should not be viewed as limiting, but rather to disclose in detail one particular way for carrying out the invention. Although the embodiment disclosed hereunder is directed to a system for the transmission and distribution of weather related multimedia programming, the invention may be used to distribute many different forms of information, including, but not limited to, sports, education, entertainment, business and commercial-programming, data and other information.

Types of Data Transmitted

Data types have important ramifications with respect to the function and capacity of hardware involved in processing, transmitting and distributing information. Data types may be defined based on three criteria: Lossiness, Average Size, and Real-Timeliness.

Lossiness refers to the degree to which data degradation (e.g., due to compression) will be tolerated by system 9. Lossless data cannot tolerate any data degradation. Lossy data can tolerate some degradation. Average size of the file is generally computed in megabytes and is relevant because the conduit (the "pipe") through which the data is transmitted is often limited. Thus, larger files may require special handling considerations. Real timeliness refers to the urgency of the data. Thus, a severe weather alert is urgent, whereas an upgrade to an infrequently used software utility may not be urgent.

Data may be divided into four classes:

Class A Data

Binary Lossless: Usually under 1 MB. This type of data normally consists of command strings, tabular, and narrative weather data, and relatively small bitmaps such as the national weather map. It is not generally acceptable for data to be lost in the compression and processing of this data.

Class B Data

Single Variable Frame Lossless: Large files, such as bitmaps and programs. Again, it is not generally acceptable for data to be lost in the compression and processing of this data.

Class C Data

Digital Audio/Video Lossy: Large audio and video clips. These files require large amounts of storage space and normally must be compressed, which may cause the data to be changed and perhaps degraded to an acceptable extent in the process.

Class D Data

Analog transmissions.

Figure 1:
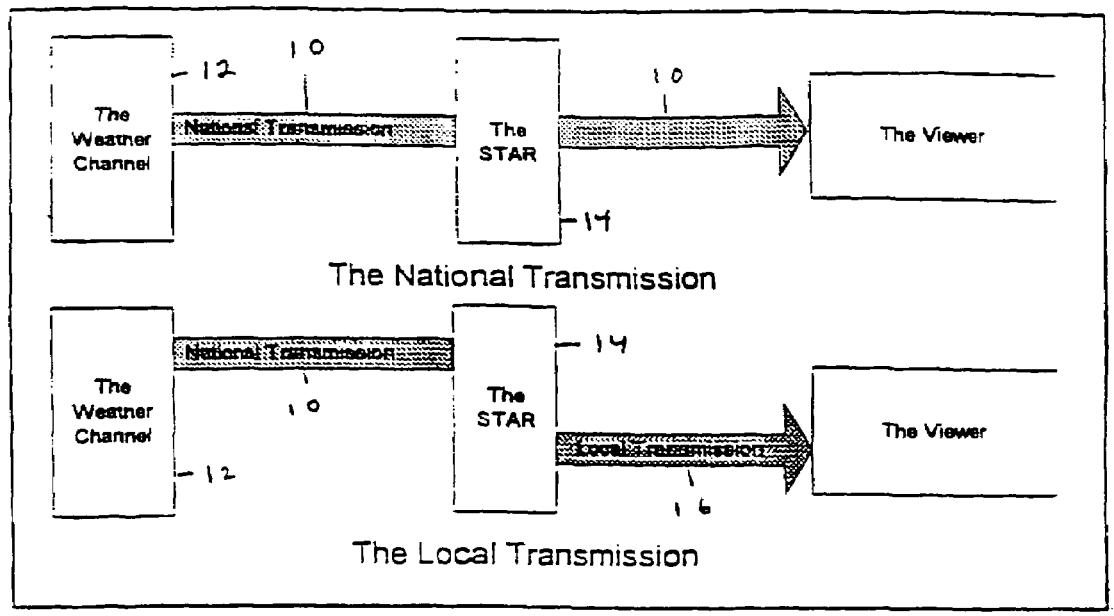
FIG. 1 is a block diagram of a conventional video and data distribution system illustrating the transmission path of the national and local transmissions.
Figure 2:
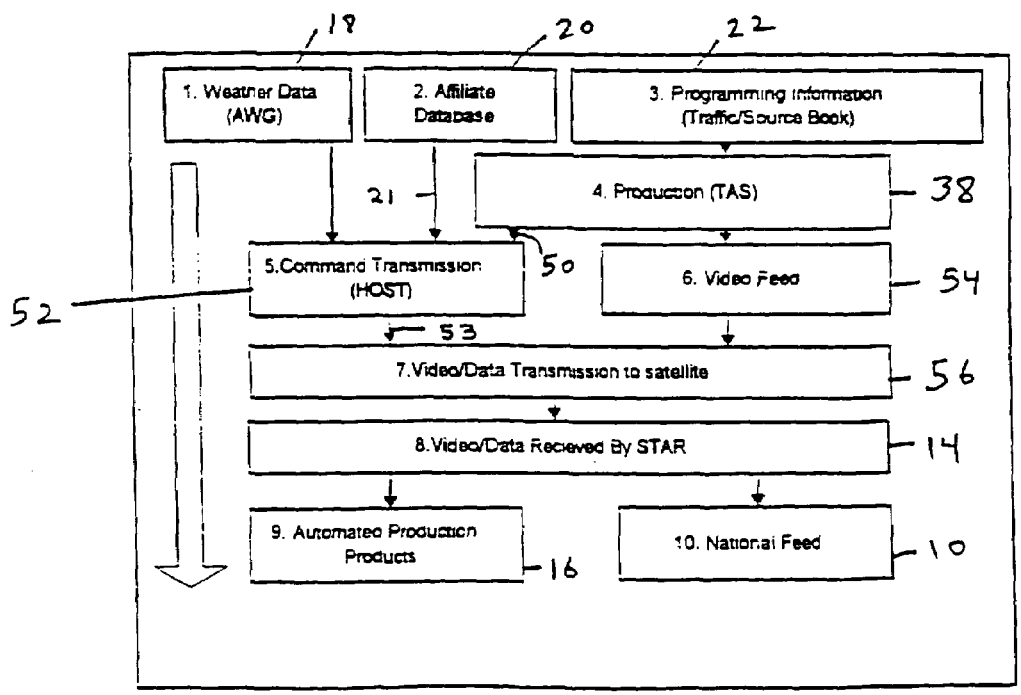
FIG. 2 is a block diagram of a conventional video and data distribution system illustrating the flow of information through the production system.
Figure 3:
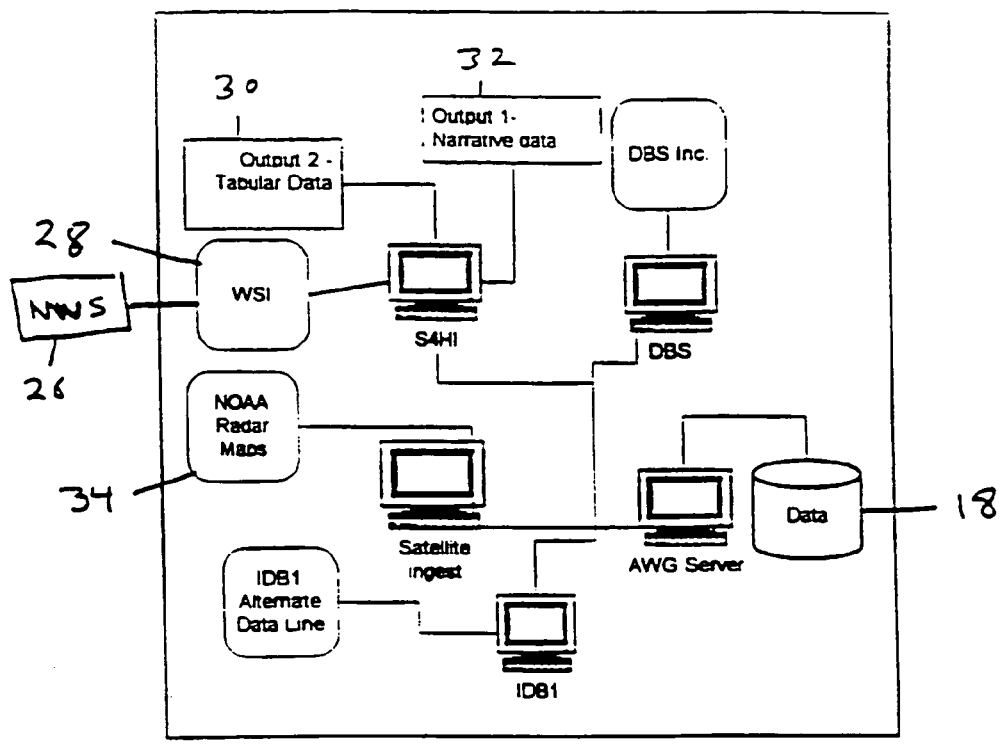
FIG. 3 illustrates the structure of the Advanced Weather Graphics System of a conventional video and data distribution system.
Figure 4:
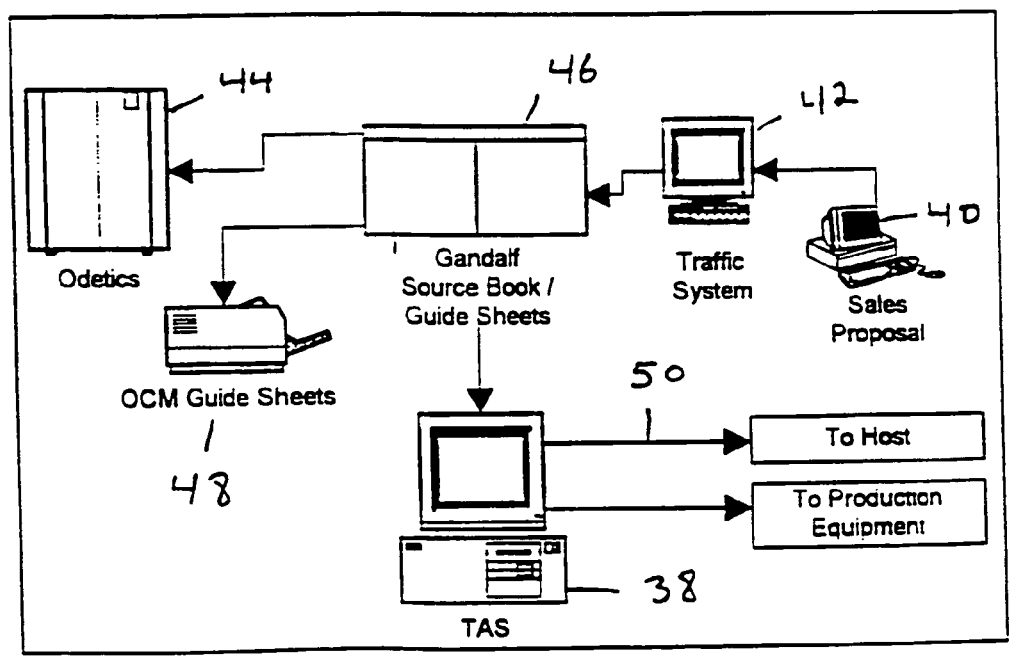
FIG. 4 illustrates the structure of the production engine of a conventional video and data distribution system.
Figure 5:
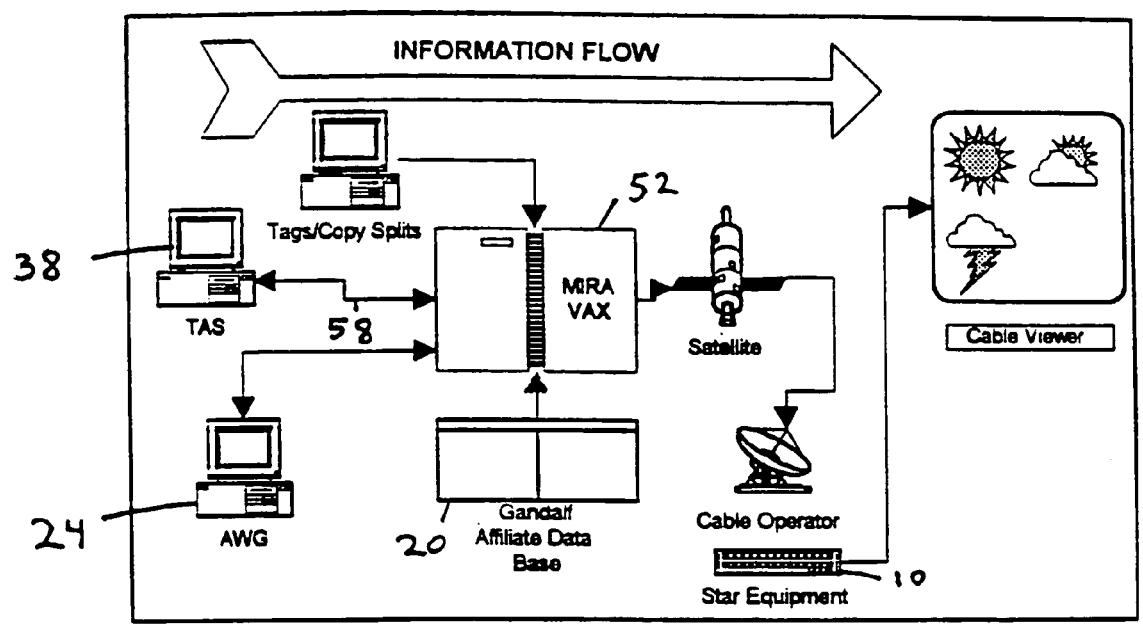
FIG. 5 illustrates the flow of data through the host of a conventional video and data distribution system.
Figure 6:
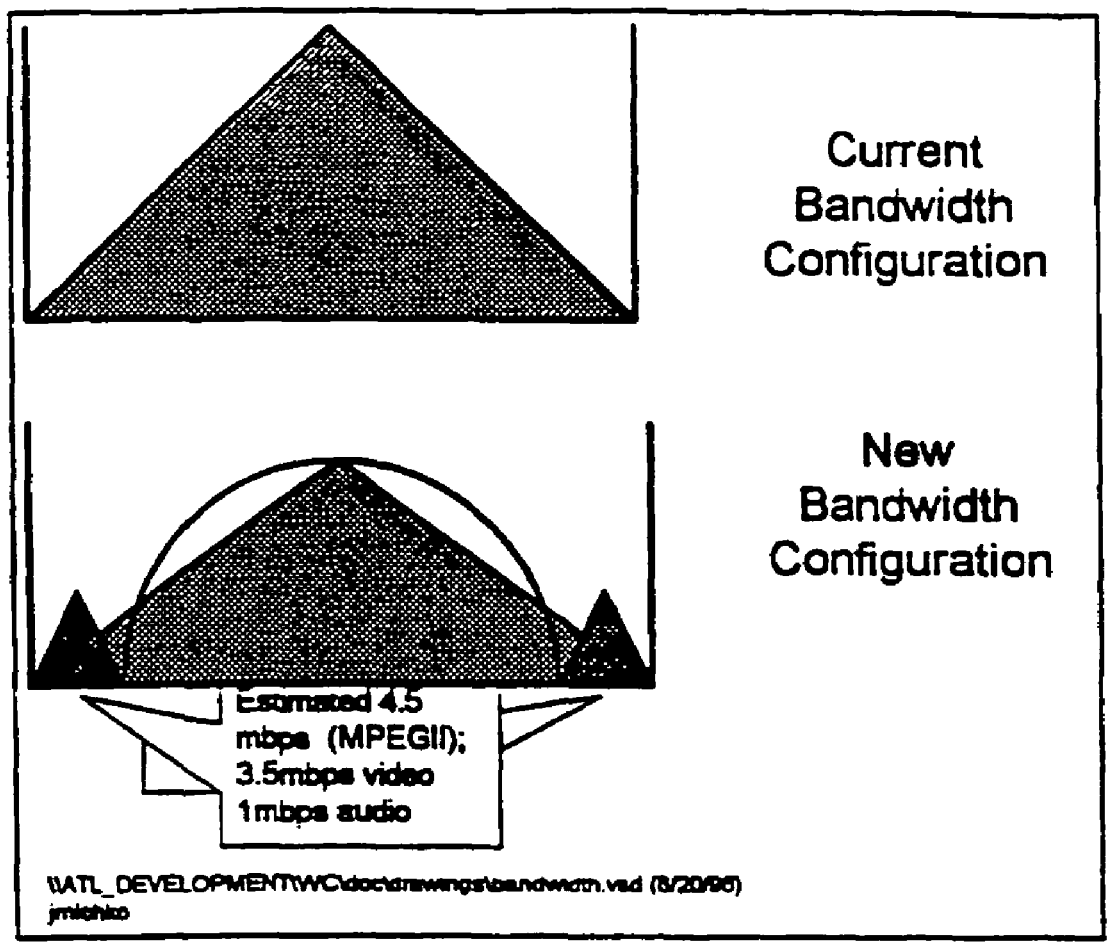
FIG. 6 illustrates a scheme for providing additional transmission band width in a multimedia transmission and distribution system according to the present invention.

These data types reflect the increased flow of data to receiving unit 14. This flow requires increased space and transmission lines. To achieve the needed pipe size, current bandwidth may be manipulated to allow more data transmission without affecting current transmission reception. Signal processors snip the ends off of the current bandwidth and send compressed data through the two ends. FIG. 6 illustrates such a strategy. Also, as described more fully below, a dynamic scheduling system may be employed to maximize utilization of the pipe. Other means of providing increased transmission capacity may be employed as appropriate.

Data Generation

The sources of the information to be transmitted and distributed are national transmission 60, weather (via met system 66), and scheduling 64. National transmission 60 runs continuously, whether it is live or pre-produced. This is necessary because not all cable operators have receiving units 14 for local weather transmissions. Also, some viewers have their own satellite dishes or direct broadcast systems and do not receive local transmissions. In these cases, the cable operators and viewers continue to view the national transmission 60 throughout the programming day.

System 9 treats all programming segments, including advertisements, as products. Product development system 62 provides the mechanism by which these products are created and introduced into the system. Examples of products that may be displayed include: radar, current conditions, 36-hour forecast, regional observations, regional forecast, almanac, extended forecast, tags, copy splits, custom products. Of course, because the system may also be used to distribute non-weather information, any number of products may be envisioned. For instance, a sports channel may display game statistics, scores, etc.

Traffic system 64 provides the template for production and advertisement schedules for the programming day. This template is delivered as a static file and is made real-time by real-time source book 78.

Weather observations arrive from met system 66 and are delivered to product server 76 where they are ingested, addressed (via data supplied by AIMS), logged, and forwarded to host 52 and the Voice-Over Support System (VOSS) 77. Product server 76 feeds data to the in-house receiving unit (via 10 based "T" connection or over its own network)

VOSS 77 provides system 9 with a means for allowing the presentation of graphics and speech to be synchronized and delivered to selected receiving units 14. This technology allows the operator to produce and deliver market specific audio forecast presentations to air during local transmissions 16.

To record audio transmissions, the On-Radio Meteorologist (ORM) requires equipment to record, store, and transfer audio. This is performed by digital audio sampling device 104 (essentially a computerized tape recorder), such as an Enco Audio System. Device 104 allows audio mixing; recording from a number of sources; and the storage, compression, playback, and transfer of audio files. Device 104 is used to record and playback voice files. Device 104 in voice booth 102 is used to record and pre-view voice files. Device 104 is used for playback of voice files to air.

The ORM requires local weather information from met system 66. VOSS 77 feeds this information to the ORM in an easy-to-access manner, so that the data can be read into the device 104. Voice booths 102 are used to record local transmissions 16, and provide another source of information. They are supplied with equipment to record transmissions and provide local meteorological information to the meteorologist. The workstation in voice booth 102 has the same functions as the prep station (not shown).

The prep station allows the user to view any products supplied to system 9 by met system 66. The prep station is responsible for preparing scripts which are supplied to product server 76. The scripts specify the components and the duration for a selected local playlist. Once the playlist is prepared, the prep station downloads the script to product server 76. All narrative text editing takes place at met system 66. Met system 66 feeds data to product server 76. The user in the voice booth has the ability to access narrative, tabular, graphic & imagery information from met system 66.

VOSS 77 is adapted to address and continuously receive data for specific markets. When voice booth 102 sends out a request, VOSS 77 acknowledges the request and runs the file. The output of VOSS 77 is then monitored by the user in voice booth 102. MDS 68 monitors the automation playlist in order to schedule the playlist transmission to specific local markets.

Automation system 72 controls and manages the playlist and triggers device 104 and host 52 for field recordings and playback. Host 52 is the real time engine that controls the scheduling and execution of products to be displayed on receiving unit 14.

Affiliate database 20 connects directly to product server 76. Affiliate database 20 maintains the integrity of the affiliate information in the product server's database. This allows all other applications to view this as one logical database.

VOSS 77 may be programmed via a graphical user interface in the following manner:

Screen One allows the selection of the city to be edited for a particular presentation. This is a drop down window feature that allows scrolls through the cities loaded in the system. The operator scrolls through the menu by using the up and down arrows or by moving the slide bar with mouse. Once the city is selected, the operator may press enter or double click the mouse to select the city. After a city is selected a window appears. In that window there are three options to choose from. (1) metro forecast; (2) county specific; (3) Head-end specific. Once the selection is made, the interface advances to the next screen.

Screen Two offers two functions:
  a) Selection of the playlist to be prepared; and
  b) Pull-up the playlist by typing a file name.

The pre-programmed playlist includes market specific alpha, beta, gamma, delta, and sigma files.

Screen Three is in a spread sheet type format. The operator has the ability to edit, delete, or insert on any field necessary. The fields and their functions include:
  a) Flavor type—Header title indicating the sequence of products or "flavor" being prepared.
  b) City—Indicates the city for which the forecast is being prepared.
  c) Head-end address—Indicates the receiving units 14 that will receive product and audio data.
  d) Expiration time—Indicates the expiration time of a playlist. This time stamp is embedded in the product data stream.
  e) Total duration—Shows the total run time of the playlist.
  f) Duration field—Shows the duration of a product in a playlist. This is a changeable field.
  g) Product type—Indicates the type of product (e.g. current condition page).
  h) Notify field—In this field it may be determined whether the operator or talent is alerted when special weather conditions are transmitted.
  i) Product ID—Indicates the type of product via its ID number (e.g. AL001X=c=Almanac).
  j) Priority field—Allows the operator to assign a priority for the transmission of a playlist (e.g. 3=normal, 2=high, 1=highest).
  k) Time slot—This allows the operator or talent to choose the forecast they want the playlist to preempt.
  l) Pre-load—Allows staging of the playlist.
  m) Record—A GPI trigger that takes the interface to the countdown window (4) and simultaneously trigger device 104 to record and start the playlist sequence. Device and the playlist should not fire until the clock reaches zero.
  n) Save—Allows saving of the playlist to a file name for recall at a later time.
  o) Quit—Takes the user back to screen #1.

Screen Four appears when "record" is executed (in screen 3). The system switches to screen 4 and starts the countdown sequence. At zero, the system switches to screen 5 and, via GPI, triggers device 104 to record and start the playlist sequence. Executable icons include:
  a) Hold—Holds the countdown sequence.
  b) Start—Re-starts the countdown sequence when Hold or Stop is triggered.
  c) Stop—Stops the countdown sequence and re-sets to the default countdown time.
  d) Quit—Stops the countdown sequence and sends the user back to screen 3.

Screen Five allows the user to see the playlist sequence while the user synchronizes voice with each product. Executable icons include:
  a) Stop—Stop halts the process and re-sets the playlist and device 104.
  b) Start—Simultaneously re-starts the playlist and device 104.
  c) Re-play—Allows the user to perform quality control on the presentation.
  d) Send—Sends the product and voice files to their proper holding destination before going up on the satellite.

VOSS 77 functional requirements preferably (but need not) include:

1) Voice files are mixed at receiving unit 14 during the local forecast with the national music feed. The national feed may be reduced by 2 db (~30%) and the voice file Eplayed back at its normal level.

2) A priority "one" playlist is transmitted within 5 minutes of MDS 68 receiving the request.

3) Each in-house receiving unit 14 is configured regionally. Receiving units 14 are placed on the router and routable to any selected voice booth 102.

4) All updates from product server 76 to all in-house receiving units 14 are automatic and continuous.

5) Regular forecast air pass-through audio at their full levels.

6) Playlist for all markets are pre-built products. The operator has the ability to dynamically edit playlist fields. This includes durations, products, expiration time, priority, and time slot.

7) All playlist files are scheduled to transmit once received by host 52. If the associated audio file does not reach the receiving unit 14 when local forecast 16 is triggered, the system recognizes that the associated voice file is not present and passes national audio at its full level.

8) The in-house receiving units 14 must be continuously updated with the most current data by product server 76.

9) When host 52 transmits new weather data to the field, receiving unit 14 associates that new data with current voice-supported products airing during local forecast 16. Once the association is made, receiving unit 14 dismisses any voice file previously associated with that product(s) and go to national default audio. However, some products continuously receive updates during the life of a playlist (e.g. temperature, wind, etc.) These products should continue to play their associated audio files. These products are identified for the programmer.

10) Improperly formatted messages are rejected and passed to the receiving unit VOSS position.

11) All specific playlist and voice support terminate at their expiration time.

12) All narrative text updates are performed preferably at met system 66 terminal rather than VOSS 77.

13) Each element of a playlist is recorded separately and reassembled at receiving unit 14.

14) Each element of a playlist may be recorded individually or collectively.

15) Ability to request supporting data, playlist, etc. from multiple VOSS 77 work stations.

Local transmission 16 may also include video portions, such as local weather reports, commercial advertisements, etc., tailored to each region. To record the production of local weather reports, additional video recording studios 106 must be installed. Studios 106 can also act as backups for national transmission 60. Production systems facilitate the recording, storage, and transfer of digital media.

Recordings from local video studios 106 are stored on media server 108 until transmitted to receiving units 14. Each local video studio has manual control panels, much like the national studio. These panels can also be used as a backup, should the main studio control panel fail.

The primary source of information, which may be weather data or other types of information, enters the system through met system 66. Met system 66 is a system for collecting and formatting data for use by the other elements of system 9. Met system 66 preferably communicates with host 52 via TCP/IP Ethernet. Met system 66 feeds all localized weather data—temperature, weather conditions, etc. Such data features an address-level scheme information for downward compatibility with previous systems. These addresses are converted into the Command/Query architecture. Met 66 provides the national radar map, immediately upon receipt, as frequently as every five minutes. Host 52 is responsible for sending the map to all receiving units 14 within the next five minutes, but preferably on an average of no more than thirty seconds following receipt by host 52.

Warnings and advisories are transferred in real-time and host 52 transmits them to receiving units 14 preferably within one minute and more preferably within thirty seconds. Warnings or advisories not sent because of the system's inability to interpret them should be displayed on the command console and/or printed.

Media server 70 stores digital and audio clips for future transmission, and records and transmits data on command from automation system 72. Because of its transmission method, it can only store digital video and audio (Class C) files. Tape console 44 is currently envisioned as a component of the media server 70. Tape console 44 is a video tape "jukebox," such as an Odetics, and acts as a repository for video productions off-loaded from the media servers, particularly national commercials.

Coordination and Assembly of Data

To route data to individual receiving units 14, host 52 requires affiliate information. The Affiliate Information Management System (AIMS), maintains affiliate-related data for each receiving unit 14. Each receiving unit 14 is at an affiliate's place of business. That data is maintained by affiliate database 20. Because the goal of the system is to provide increasing localized productions, affiliate database 20 stores configuration modifications made to each receiving unit 14 from a generic configuration. Affiliate database 20 consolidates data into working files for addressing by host 52. When data is downloaded to a receiving unit 14 during full reconfiguration, data remains on affiliate database 20 for dynamic access via TCP/IP.

To access the required data, product server 76, AIMS and affiliate database 20 requires connectivity capable of establishing links between foreign databases. With such a link in place, a read-only interface into affiliate database 20 provides access to its data elements. Data is then converted to a predetermined data format and posted to the product posting file 84, where host 52 can access the information.

Affiliate database 20 supports additional features, thus the database is preferably modified to contain the following additional fields:

Receiving unit type. This field contains a value indicating whether receiving unit 14 is a local edition or a standard receiving unit.

Receiving unit IP Address. This field contains the IP address of receiving unit 14 to facilitate use of Command/Query.

Host File. Affiliate database 20 compiles affiliate data into an addressing file for host 52.

Update host. Mass updates may occur once each day, such as at 18:00 hours (6:00 PM) Eastern Standard Time (EST).

S4 Address. Refreshes receiving unit data once each hour.

Ski Tags.

Rotate Ski Tags

Garden Tags.

Master Dynamic Scheduler (MDS) 68 adjusts systems 9's schedule and communicates that schedule to automation system 72 and host 52. MDS 68 coordinates with all other system elements to update schedule adjustments. MDS 68 also calculates and schedules the downloading of products 64 from product server 76 through the host 52. MDS 68 may simply provide for original posting of and updates to the daily schedule log. MDS 68 may also organize and schedule product downloads through other channels outside host 52. MDS 68 may also organize the routing of digital media, such as host command data, device 104 audio data, and media server 108 digital video data, over available digital lines.

Automation system 72 is a scheduling subsystem that controls and schedules the production components. Some schedule events such as off-line video and audio production, are in the domain of automation system 72. However, when scheduling affects the transmission of information to receiving unit 14, automation system 72 works as a sub-system of MDS 68.

Host 52 accepts its schedule from MDS 68. To execute the next event in the schedule list, a Take Command is sent from automation system 72 in the form of a 5-volt pulse. When such a command occurs, host 52 sends a command to receiving unit 14. Host 52 acquires prioritized data from the product server 76:

Priority 1—Class A command data and important weather information.

Priority 2—Class B standard weather data.

Priority 3—Class B data consisting of programs and graphics.

To execute the next event in the schedule list, a Take Command is sent from real-time source book 78 in the form of a 5-volt pulse. Host 52 takes the data and delivers the data to the master router 80 for delivery to receiving units 14.

Host 52 also performs some additional formatting of the data. For instance, text may be formatted for particular screen configurations to avoid orphans or other aesthetic anomalies. Host 52 may also perform some dynamic scheduling. For instance, by applying a set of rules, the host may determine that a particular set of data is more time critical than other data and move the time critical data to a higher transmission priority. For example, a weather warning might override data reflecting current weather conditions. Thus, the weather warning information would be moved to the front of the queue. Backup host 74 also accepts its schedule from real-time source book 78.

Figure 9:
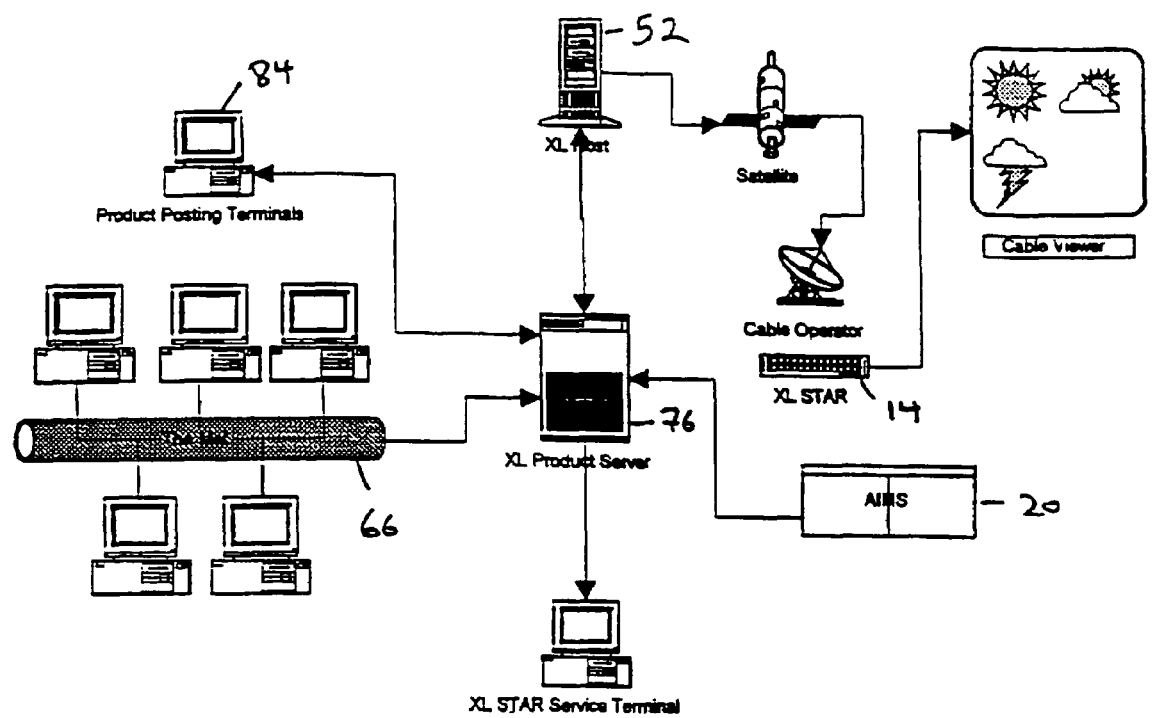
FIG. 9 illustrates the configuration of the product server of the system of FIG. 7.

As illustrated in FIG. 9, product server 76 is the primary central database and computing resource for system 9. It is responsible for handling of addressing, configuration, meteorology, data mirroring, and transaction logging for host 52. Through Product Development Management System 84, all meteorological data, presentation products, and configuration information are docked for eventual transmission to a receiving unit 14.

From the product server 76 perspective, there are three types of data that must be transmitted to receiving unit 14 to form a transmission: Command, Cyclical, and Real-Time Weather Data. As notices of modified data are received by product server 76, they are categorized accordingly. This categorized data is then formatted and combined with addressing information retrieved from affiliate database 20. This final data product is posted to Product Posting File 82, which is continuously polled by host 52. Product server 76 and host 52 may be resident on a single platform such as a Hewlett Packard 9000, or may be resident on separate platforms.

Referring to FIG. 7, the Master Control (not illustrated) allows monitoring and human intervention into the system.

System Maintenance

The Engineering Maintenance System (not shown) provides access to, and diagnostics utilities for host 52. Maintenance System 86 provides hardware and software to configure and maintain equipment, and provides local and remote (modem) diagnostics of individual receiving units 14.

Transmission of Programming to Receiving Units

Master Router 80 routes all production lines, and has four important input lines.

1. National Feed Video 82 which carries national transmission 60.

2. National Feed Audio One 82 which carries the audio associated with national transmission 60.

3. National Feed Audio Two 82 which carries alternate audio, normally for music associated with the national transmission 60.

4. National Feed Audio Three 82 which carries alternate audio, normally for foreign language associated with the national transmission 60.

Under the control of automation system 72 and the Master Control Panel (not shown). master router 80 coordinates inputs with the various outputs. The inputs defined above are matched with their corresponding outputs as follows:

1. National Feed Video (NFV) 88
2. National Feed Audio One (NFA1) 90
3. National Feed Audio Two (NFA2) 92
4. National Feed Audio Three (NFA3) 94

From this point, all outputs take different paths to their final combination into a satellite signal.

The national feed must be scrambled along with its two most closely associated audio feeds. All three, NFV 88, NFA1 92, and NFA2 94, are combined and scrambled at the National Feed Scrambler 96. Once combined, this information is fed into subcarrier combiner 98. Sub-carrier combiner 98 takes the following inputs and combines them into one broadband output including the scrambled national feed, national audio feed three 94 and receiving unit command feed 100.

Additional equipment may be added to the transmission systems to accommodate an increase in data flow. This equipment provides the following data lines:

Two 3.5 MB Digital Video Streams 110, 112.

16 Audio Channels with 256 KB per channel (not shown).

In such an event, the signals may be encoded individually before being combined. Encoder 114 encodes national transmission 60. Encoder 116 encodes digital video one line. Encoder 118 encodes digital video two line. Multiplexor 120 distributes encoded data depending on need. Combiner 98 compiles encoder lines into one transmission.

A modulator (not shown) accepts video as analog, audio as analog, and data as a digital feed, and will modulate them into a broadband signal transmitted via satellite to all receiving units 14. For the transmission, the signal is compressed, providing three video and associated audio channels, along with three additional audio channels. This compression method also supports three data channels with a 512 KB transfer rate.

The portions of system 9 installed at the cable operators' sites consist of many subsystems allowing communications from host 52, connections to auxiliary equipment, and diagnostics. Referring to FIG. 8, the broadband signal transmitted from system 9 is fed into the integrated receiver and descrambler, where the National Video (NFV) 88 and associated audio (NFA1 90 & NFA2 92) are separated and descrambled. Both are then fed to receiving unit 14, along with the descrambled broadband signal 122 containing all of the video and audio bands.

The Digital IRD (not shown) is added to the existing Analog IRD. This device receives the compressed feed and provide selected access to the new digital audio and video. The system uses an RS232 control line from system 9 to determine which of the two digital data feeds will provide D1 input. On the audio side, each channel provides eight audio streams; the control line allows system 9 to select which of these it will use.

Delivery of Programming to the Viewer

The programming is received by the affiliate and delivered to receiving unit 14 where it is processed for delivery to the viewer. Receiving unit 14 is considered an industrial automation system. It is capable of operating in an environment that is much different than a residential installation. The hardware must have a certain degree of expandability.

Thus, in an illustrative embodiment, receiving unit 14 is based on a motherboard supporting a RISC SC processor running at 180 megahertz, 64 megabytes memory, a power supply, two two gigabyte hard drives, a high speed RS422 data port, three high speed RS-232 data ports, a GPI interface, a fast and wide SCSI interface and a video processing board. Other components may just as easily be used to serve these functions. Various ports are provided for external interface, including a 100/10 BaseT Ethernet port for TCP/IP access. In the illustrative embodiment, a Silicon Graphics workstation is used as the platform, which is available from Silicon Graphics, Incorporated at 2171 Landing Dr., Mountain View, Calif. Other platforms may be used as receiving units 14 as appropriate.

Receiving unit 14 includes software which is a multimedia playback engine, such as Evolving Video Technology's Antero presentation software. Other commercially available or custom developed presentation software may be used as desired or appropriate. It provides the basic data format on which the data provided to receiving unit 14 is to be displayed. It also includes a play-list of video effects. A play-list is the sequence of how the data is projected onto the screen in the appropriate location.

For instance, a typical local transmission may comprise a template in which current weather conditions are displayed. The template is essentially a graphical design or structure with certain areas denoted as fields for particular types of data. One data field might be a title box which in one region may state the words "current conditions," and in another region might display the words "present conditions." The selection of words may be made by the affiliate and is programmed into the affiliate data base. Furthermore, other graphical special effects may be included such as the manner in which the text appears on the screen and various other types of visual effects, such as cross fades, etc.

Receiving unit 14 provides video production on command to cable operators. To perform this procedure, the system requires the following inputs and outputs: Broad Band In 122 which provides command data from the host 52; Analog Video 88 which provides National Video Feed 88 for national transmission 60; Audio Left 90 which provides input for Audio Left (NFA1 90) for national transmission 60; Audio Right 92 which provides music for the local transmission 16; Analog Video Out 124 which provides the video signal for the cable network whether local transmission 16 or national transmission 60 is passed-through; Analog Audio Out 126 which provides the audio signal for the cable network whether local audio or national audio is passed-through; Weather Sensors In 128 which provides the attachment for local weather sensors; and RS232-In 130 which may be used with a modem.

The receiving unit software is responsible for the basic operation of receiving unit 14, maintaining its database and overall maintenance. The software supports a subset SQL-compatible command strategy. It interprets SQL statements, first to determine whether they meet the query specifications, and second to execute their commands. The software may interpret precompiled or ASCII text versions of the command set.

The software may execute a prerecorded, downloaded list of presentation events in coordination with the third-party application software. It monitors the execution of these events, down to the frame-level, and has the ability to skip forward events in the playlist if required.

The software supports a TCP/IP terminal interface for configuration and diagnostics. The options provided include the following:

Log-in: Provides secure access to the system resources.

SQL Command Line: A command line at which the user enters receiving unit SQL statements.

Set Transaction Log Parameters: Allows the system engineer to select the event that will be written to the log.

Set Transaction Log Duration: Allows the system engineer to select the amount of time events will be held before they are deleted.

Set Cloud-Net IP Address: Allows the system engineer to set the IP address of receiving unit 14.

Set Internet Assigned IP Address: Allows the system engineer to manage the true IP address of receiving unit.

Reset All: Reset the system.

Reset Software: Purge all software and reload.

Print/Transfer Transaction Log: Print the transaction log to a local printer, or transfer it to the host hard disk.

View System Log: View the transaction log.

Clear System Log: Purge the error and transaction log.

Clear Current Errors: Clear the current error status, which will clear the notification icon.

Configure notification parameters: Configure notification methods such as dial-beeper, show notification icon error levels, and report to host error levels.

Command Query Interface: Allows the user to enter command query line entries.

Log-out: Log-out.
    The system software records the following events:
    Failed File Transfers.
    Failed Command Interpretations.
    Operating System Errors.
    Optional Events with User-Defined Duration:
    Any Selected Query/Command.
    Any Select Data Element Access.
    Actual Execution Time and Duration of Any Playlist.
    Actual Execution Time of Any System Function.
    Monitoring of Any Input/Output Device or Port.
    The command stream between host 52 and receiving unit 14 is a TCP/UDP/IP connection selection protocol. When in satellite transfer mode, the socket selected provides a UDP protocol with a loop-back that simulates TCP connection orientation. When a connection is established over a communications line supporting TCP/IP, the connection runs under true TCP/IP. Simulating TCP/IP over the connectionless satellite communication path provides the system with the ability to receive data over the RS232 or Ethernet connections with error reporting. This facilitates diagnostics and off-line downloading of commands and data without the need of special utilities.

Software loaded on receiving unit 14 has a hardware abstraction layer that intermittently performs the following tasks: disk defragmentation; system database mirroring, configurable local dial-up reporting of system errors; configurable dial-up reporting to a global system error log; configurable beeper notification of system errors; and configurable display of yellow and red blinking icons to indicate that system errors have occurred requiring local-system engineers to review error log, solve the problem, and clear the error.

The system database contains all information needed for operation. It supports the insertion or deletion of data elements. Data elements allow sub-fields. Sub-fields are fully configurable and have the capacity to contain the following data types: zero terminated variable length string, byte, integer, double, variant, and float. Weather data contains information indicating the data is valid only for a limited amount of time. The time period and time-stamp of the data are maintained, and the time period is configurable.

One important goal of system 9 is to provide powerful product development tools to developers and remove custom programming tasks required from support staff. All products contain a presentation editing system capable of saving presentations and all effects in a useable file format. The software provides a run-time engine controlled by the system software that executes the pre-developed presentation in real-time.

The editor allows smooth interaction with a Graphical User Interface developed for playlist editing. Features allow for launching the run-time engine with a current playlist for testing and drag-and-drop editing of data elements onto the editing canvas.

The run-time engine allows full control and communication with the system software. This control is at the frame-level. The run-time engine is able to communicate errors and allow the system software to ascertain missed frames.

System 9 provides the standard effects shown in the following table:

| Feature | Effect |
|---|---|
| Crawl | Display all lines in a text block as a single line that crawls from left to right across the screen. |
| Ease In | During the first 25 percent of effects duration, effect starts slowly and accelerates to full. |
| Ease Out | During the last 25 percent of effects duration, effect decelerates to the effects completion state. |
| Chroma Key | Use of a video signals color characteristics to cut a foreground image into a background image. |
| Page Reveal | Reveals the new page as the existing page pushes off of the canvas from the direction the user specifies. Effect direction: From bottom left, bottom right, left, right, top left, top, top right. |
| Push | Pushes a new page on to the canvas from the direction the user specifies while pushing the existing page off. Bottom left, bottom right, left, right, top left, top, top right. |
| Reveal | Display different objects on a page based on the order in which the user entered, until the entire page is displayed. Bottom left, bottom right, left, right, top left, top, top right. |
| Reverse | Display all the lines of text on the page as a single line that crawls from left to right across the screen. |
| Reverse Roll | Roll each line of the page vertically down from the top of the screen at a specified speed until the top line rolls off of the canvas. Effect direction: Top. |
| Reverse Zip | Move each line of text on the canvas from left to right based on the order in which the user typed the lines. All lines of text end up justified on the screen. Effect direction: Line by line from left. |
| Roll. | Roll each line of the page vertically up from the bottom at a specified speed until the bottom line rolls off the screen. Roll-effect direction: Bottom. |
| Wipe | Wipe a new page on screen and the existing page off from the direction the user specifies. Wipe-effect direction: Top down, bottom up, center out, right to left, left to right. |
| Zip On | Move each line of text on to the canvas from right to left based on the order in which the user typed the lines. Effect direction: Line by line from right. |
| Multi-line Crawl | Simultaneously crawl each line on a page in different locations on the screen. Crawl - effect direction: From left to right, right to left. |

Receiving unit 14 is aimed at providing highly sophisticated, visually stimulating presentations of information.

Each receiving unit 14 has its own set of base maps and station identifiers. Base maps have projection information allowing for the proper placement of station (city) identifiers. A table showing a station's latitude, longitude, and name (long and short names) is stored in the database. (The latitudes and longitudes are visual latitudes and longitudes, not the actual.) Each receiving unit 14 may store the actual latitude and longitude of the cable operator, along with the visual latitude and longitude for the center of any local view ports.

Receiving units 14 support a zooming capability. At various levels of the zoom, information, such as city names and weather conditions, may be hidden or revealed. A macro scale view allows the viewer to see less density of cities, while a tight zoom-in allows the more densely clustered cities to appear in an easily readable form. Also, receiving units 14 support any map projection and are able to merge maps of differing projections.

Receiving units 14 are capable of dynamically changing the products or the sequence of products within a product or "flavor," and creating a new flavor. Products are what the viewer sees. Local forecast, Regional Observations etc., are all presentations made up of different elements. Products or "flavors" consist of many types of data like template files for each page the viewer sees, sequence files that tell the pages when and how long to run, and product components like bitmaps, icons, and animation's that the pages use to build a presentation. The data that makes up products are product inventory items. Again these are the templates, sequences, and graphics that make up any presentation. These can be viewed as the tool chest the presentation engine uses to produce presentations. This is true for each individual receiving unit 14, as well as universally. The local forecast flavors are smart. This allows event-actuated local forecast products. For example, if a particular receiving unit 14 does not have radar echoes within its specified viewport, a different product can be presented.

The logic in the programming language that wraps around the graphics rendering script allows receiving unit 14 to pick its product, generally depending on its interest list, for example, Tides versus Almanac. Locations along the coast would display tidal information, while in land areas display the almanac.

Graphic/video functionality is provided as follows: ability to change style, speed, location, fonts, timing, and type of a crawl; ability to support real-time compositing; ability to record and playback full-motion video in real-time; ability to insert live-local presentations either as pass-through or off the disk so that the presentation can be either full-screen or squeeze-zoomed to show additional weather information; ability to squeeze-zoom the national or local transmissions to show additional weather information; ability to double-box or pass-through video for two independent video sources; ability to digitize a video stream to disk; ability to adjust compression rates of incoming video stream; ability to transfer from the national transmission to the local transmission or information screen; ability to show motion video as a background, either in real-time or off the disk; ability to make city identifiers translucent to avoid covering them by such other items as radar information; and ability to composite (layer) images.

The logical addressing of receiving units 14 is non-hierarchical and may be installed on the disk drive prior to shipment. Because changes may occur in the scheme, the addressing is down-loadable from host 52 and addressed by machine-readable serial number. Receiving units 14 can receive and store audio or video files.

Bit-mapped graphic images, such as icons, radar data, and base maps, are received and stored in the JPEG compressed format. The quality (Q) factor of the image are maintained at 80 percent, or better.

For National Weather Service (NWS) text bulletin data, receiving unit 14 selects bulletins to be stored in the database based on the passing or failure of two filters: bulletin type and station list (Universal Generic Code or UGC) embedded in the WMO header (such as WFUS1 and GAZ032, respectively).

If a particular receiving unit 14 is interested in that bulletin type, it then parses the station list embedded in the WMO header. If the station list parsed out of the message matches a station in the receiving units' 14 interest list, it is stored in selected receiving units 14 database.

A quality control routine is performed for confirming time. If the bulletin has expired, e.g., the expiration time stamp in the UGC is less than the current Zulu time, the quality control routine rejects (ignores) the message.

Certain bulletins receive special processing. Special NWS-defined delimiters cause certain blocks of information to be stored and displayed in one of the many effects enumerated earlier. For example, a NWS Zone Forecast may contain a header that warns the public of existing watches and warnings. A process parses the useful information, stores it, and creates a special display effect such as crawl, scroll, or other appropriate format. Properly delimited headlines used in NWS bulletins such as Nowcast, Short Term Forecasts, and 36-Hour Forecasts, are parsed out of the bulletins and stored as separate entities.

Tabular data is alpha-numeric weather condition and forecast information. Each tabular data type, e.g., Regional Forecast, Hourly Observations, etc., is accepted and stored by the receiving unit 14 based on the following: The message is a valid tabular data type, or a station in the interest list exists that matches the station field contained in the tabular record.

All data types stored in a receiving unit 14 database are time stamped by the originating system. Time-stamps use the Universal Coordinated Time (UCT) or Zulu (GMT) format. All NWS tabular data types expire in the database after a specified time period. The Product Team is responsible for determining the life cycle for each data type. All NWS narrative data types are deleted upon expiration of the bulletin specified in the UGC time-stamp field. All local video and audio products recorded on receiving unit 14 have an expiration time-stamp. At the end of a product's defined life cycle, receiving unit 14 defaults to a local forecast flavor if the system does not detect an updated or new local specific product.

Clock messages for host 52 cause receiving unit 14 to update the time. All clock messages are in UCT or GMT format. The clock remains on the screen in a given format despite the changing background. Receiving unit 14 supports configurable time formats (both 12-hour and 24-hour). This feature allows the installation of receiving unit 14 anywhere around the globe. The clock is used to generate a date and local time display, to confirm values on data received and to time-stamp locally acquired products, if any. The clock is capable (under software control) of interfacing directly with the video output for on-screen displays. Each receiving unit 14 maintains an offset-value in its database, allowing the calculation and display of local time on-screen. Receiving unit 14 supports update-cycles occurring as frequently as five-minute intervals. The update cycle is not hard coded, but configurable.

Receiving units 14 support animation (appear as pass-through) of radar images stored in receiving units' 14 database. Receiving unit 14 displays images one frame at a time at a controllable and programmatical rate. Receiving unit 14 maintains a table of radar images for a specified number of hours. The number of radar images stored is configurable. After a given interval, each radar image is deleted. The table is in ascending order based on the time-stamp embedded in the radar image.

Receiving unit 14 interrogates the radar information upon receipt for data that exceeds a given threshold. A flag indicating whether or not the value has been exceeded is stored in the system and accessible to the playlist interpreter. If the threshold is exceeded, receiving unit 14 generates a different playlist. Thus, a radar image showing a high density of high intensity returns may generate a severe weather warning. Because the quality of radar data is not controlled by its provider and the data may need to be adjusted depending on the seasons of the year, each receiving unit 14 has a mechanism to filter out specified radar levels (color levels).

When a valid warning message for the area is received, receiving unit 14 creates a map, either as a bug or radar base map, that fills the affected counties with a specified color. When the warning expires, the map goes back to its normal, unfilled, state. Valid warning/advisory messages are stored and placed in a crawl for display. The colors of the font background may correspond to a given warning/advisory type. For example, warnings may be displayed in red, watches in yellow, snow/cold in blue. Receiving unit 14 generates an alert tone or plays a pre-recorded audio file for each warning/advisory type. Also, each receiving unit 14 has information on warning/advisory types currently in effect, allowing it to change the local forecast product depending on the type of warning/advisory.

Convective warnings (severe thunderstorm, tornado, and special marine) generate a short (abbreviated) form of the warning message based on the fields contained in the WMO header. For example:

| | |
|---|---|
| WFUS1 = | Tornado Warning |
| GAC013 = | Cobb County, Georgia |
| 121645 = | Expiration date and time |

The resultant message would be as follows: "A tornado warning is in effect for Cobb County until 4:45 PM EDT. Stay tuned for details."

Receiving unit 14 support four modes of operation: Normal, No-Video, No-Data, and Reset. Normal Mode is the typical operating mode of receiving unit 14. It is maintained until receiving unit 14 fails to receive a valid data packet for one minute, if the satellite video is lost for 45 consecutive video frames (defined as loss of genlock), or if data is received to force receiving unit 14 to another mode. In normal mode the control of receiving unit 14 remains with the host.

No-Video Mode is entered if receiving unit 14 fails to receive satellite video for 45 consecutive frames. When the No-Video Mode is entered, receiving unit 14 is forced into a playlist designed by the product designer/programmer. No-Video Mode is canceled when satellite video is restored for the required period of time and data is present. In a receiving unit 14 equipped with telephone line access, the diagnostic routine contacts the production headquarters after detecting the No-Video condition for fifteen minutes.

No-Data Mode is entered when a receiving unit 14 fails to receive clock or data for one minute and after a successful Reset. When No-Data is entered, receiving unit 14 is forced to call a run playlist designed by the product designer/programmer. No-Data reverts to either No-Video or Normal Mode when receiving unit 14 receives sixty consecutive error-free frames, and when a complete program is resident in memory. After 15 minutes of No-Data, a receiving unit 14 equipped with telephone line access contacts the transmission source.

The Reset Mode is invoked in one of three ways: (1) A reset command from host 52 in which a manual reset command results from pushing the Reset button on the Main CPU. (2) Loss of AC and DC power where, if the start-up test procedure passes, receiving unit 14 mode changes to No-Data. (3) If the start-up test fails, the sequence recycles.

A downloading procedure is also provided. Normally, the most recent version of the system software is installed on the disk before delivery. However, it may be necessary occasionally to download new versions of the software.

Message frames containing downloadable software, if correctly received at receiving unit 14 and identified as having a different version number from the current operating module, are stored on the disk. Frames incorrectly identified as having the current version number are rejected. New software is marked as "Unusable" until all frames are correctly received. Database objects (playlists, configuration, interest lists, addressing table, tabular weather data, narrative weather data, graphics, etc.) is buffered temporarily before committing them to database. The system checks to see if the object is in use (currently referenced). If the object is being used, it is marked as "locked," and waits in the buffer until the working version is marked as "unlocked." When it becomes "unlocked," the object is deleted from the database and the new version is stored. Digitized video objects, not pass-through video, is stored on disk in either a compressed or uncompressed format. Version-control need not exist, but the object is not marked as complete until all frames have been received from the host.

Receiving unit 14 supports a terminal interface (TTY). The interface allows receiving unit engineers and programmers to interrogate databases, perform self tests, change configuration items, check current version numbers of software, check physical serial number of devices, and override serial numbers. A transaction log is maintained for tags, weather warnings, and receipt of local forecasts. The log is accessible through the terminal interface and stored on disk. The log is purged at a programmable interval specified by the operator.

If serious errors are occurring on receiving unit 14, it will, if accessible by modem, send a notification message back to the operator. Two passwords are maintained by the receiving unit database to use the interface. One is a "privileged" password for the operator allowing full access to all database elements. The second, a "non-privileged" password, is for affiliates permitting limited access to certain functions, such as crawl creation and scheduling. The affiliates can change their password, which is initialized to a default setting at the time of installation.

Using the interface specified above, affiliates are able to create a plurality of crawls. An edit function allows operators to create, update, and delete messages, and affiliates can also activate and schedule messages. The scheduler is designed to allow the cable operator to specify the frequency of the crawl rotation or indicate that the crawl is to rotate every other local forecast segment. The default setting specifies the crawl rotation frequency. Receiving unit 14 maintains a log of when a crawl was active. This feature assists affiliates in billing their clients. Local Ad Sales text messages are capable of effects other than crawl, such as fold, dissolve, and flip. The product developers decide what effects are used to display the message.

Receiving units 14 are provided three software-controlled TTL contact closures. These closures can be used for inserting local commercial or weather warnings. The contact closures are on the Data Ingest Board.

Operation of the System

Figure 10:
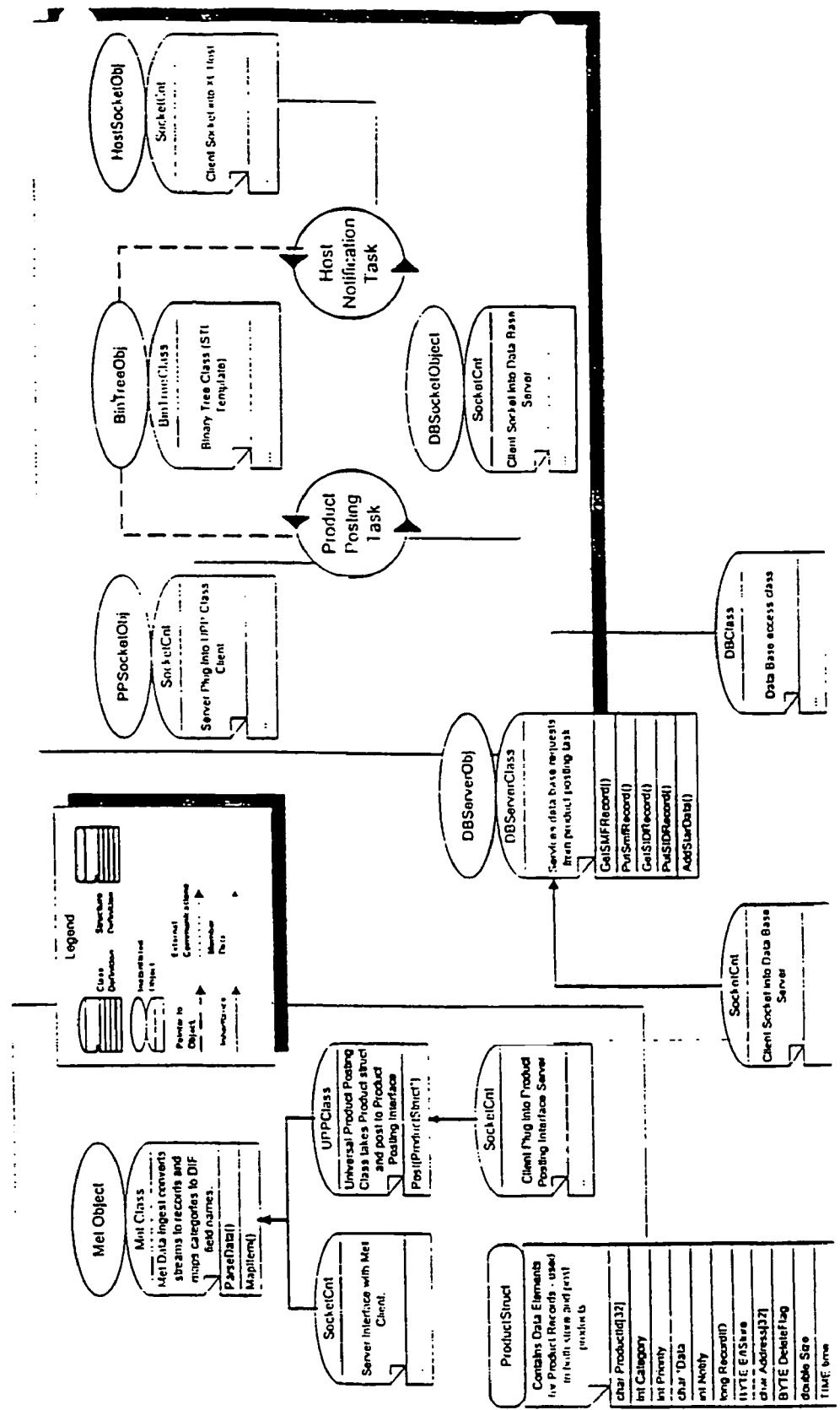
FIG. 10 is a functional object map of the system of FIGS. 7-8 which illustrates the C++ classes and objects and their interrelationships.
Figure 11:
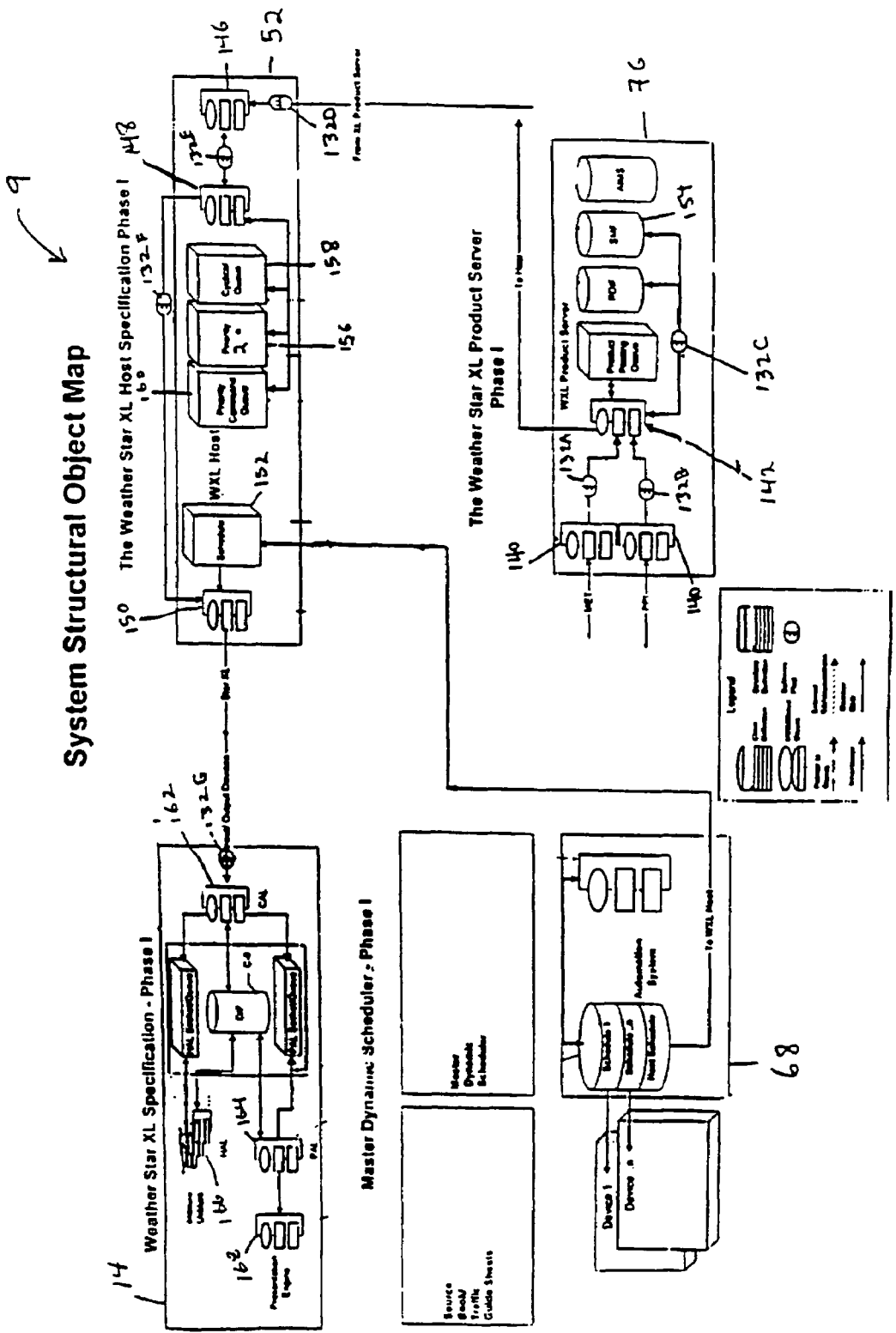
FIG. 11 is a structural object map illustrating the relationship between the components of and the flow of data through the system of FIGS. 7-8.
Figure 11A:
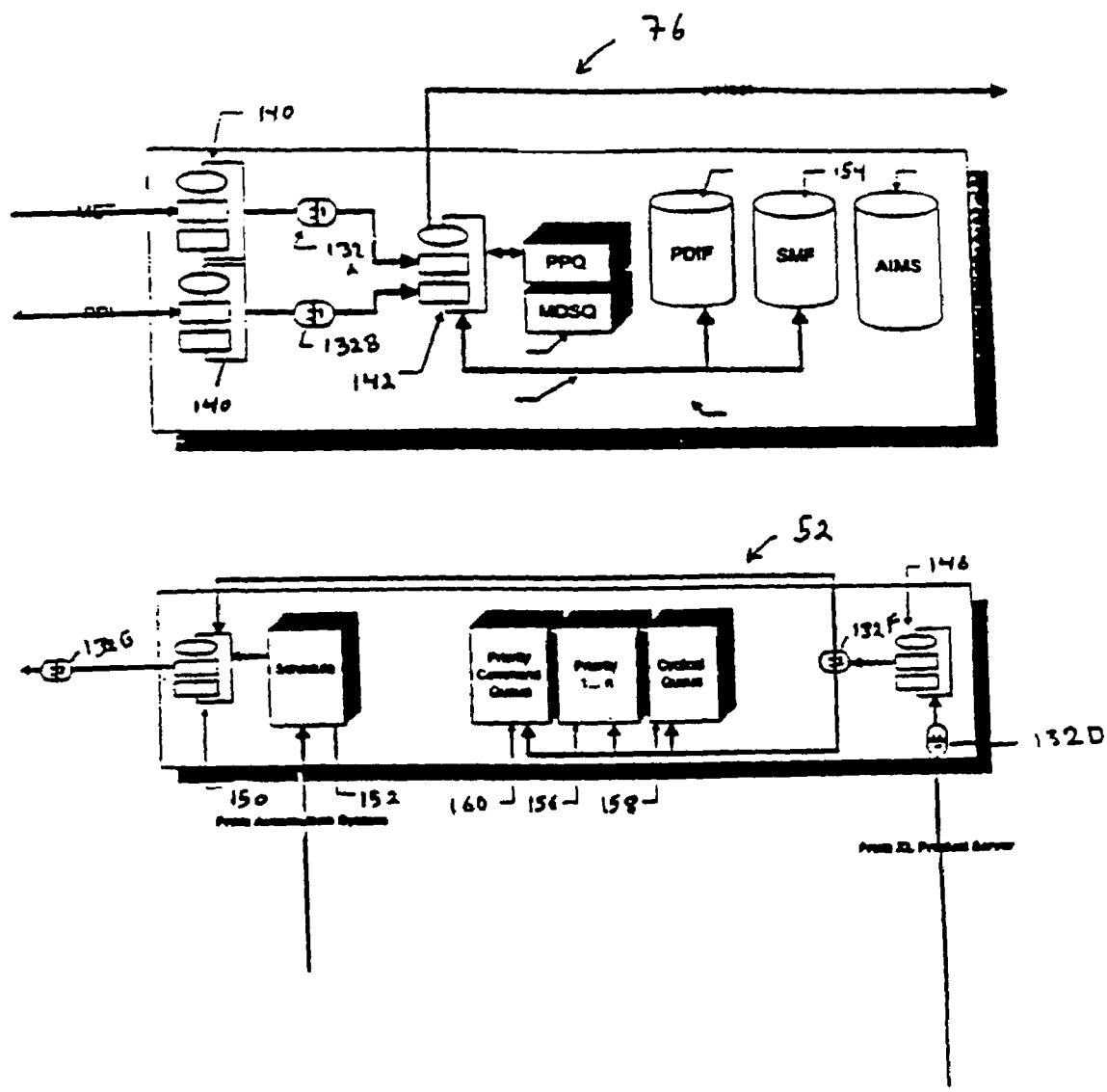
FIG. 11A is a structural object map illustrating the relationship between the components of and the flow of data through the host and product server of FIG. 11.
Figure 12:
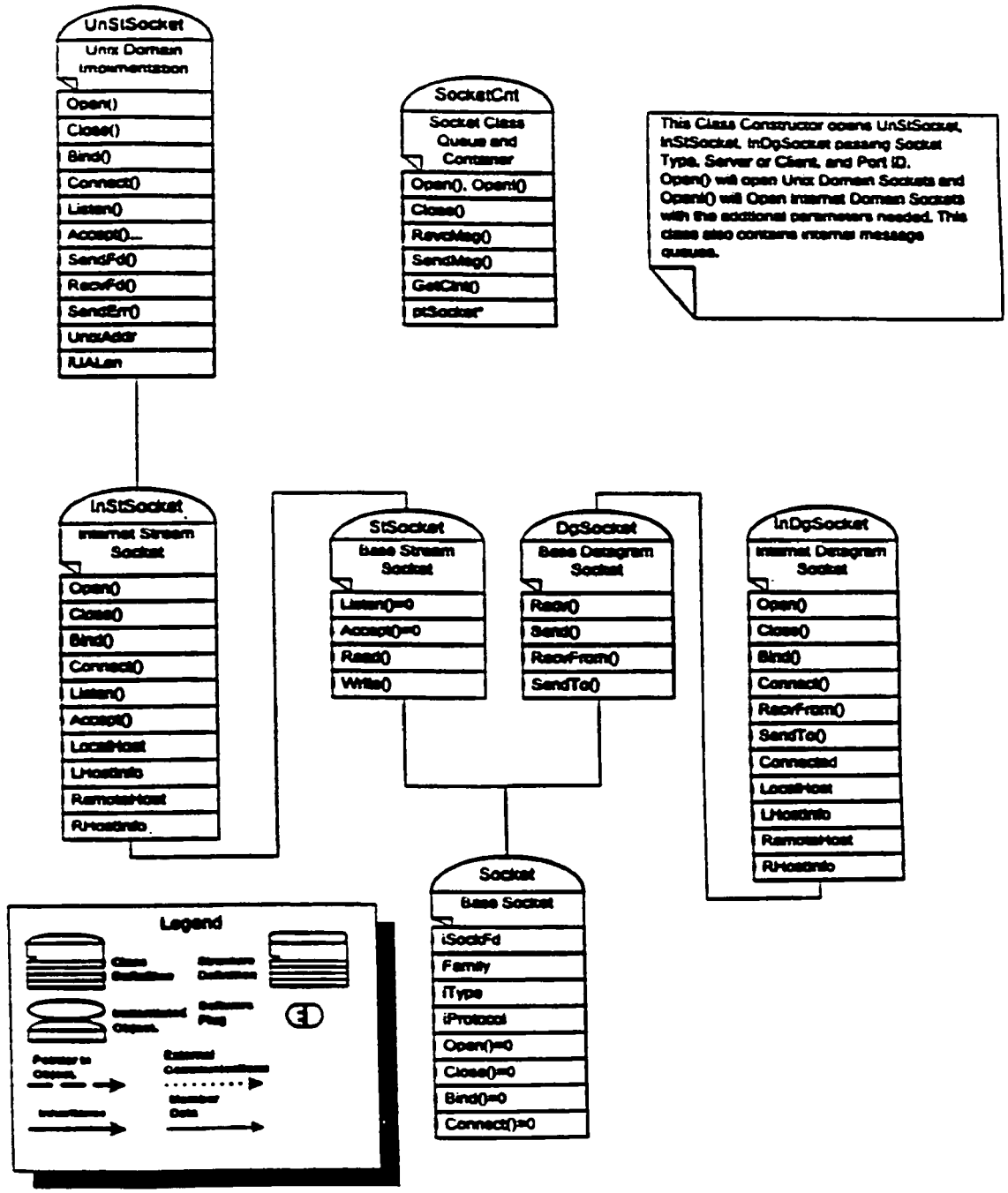
FIG. 12 is a functional object map of the socket classes of the system of FIG. 11.

As illustrated in FIGS. 10 through 11H, the processes which operate throughout system 9 are broken into a number of modules, each having distinct tasks. In order to facilitate complete modularity of design and facilitate the division of labor that accompanies such a design, system 9 incorporates the concept of a "software plug." Software plugs 132A-n are based on Sockets, a UNIX O/S construct that has become popular with the growing influence of the TCP/IP based Internet. FIG. 12 illustrates the socket classes of system 9.

Figure 13:
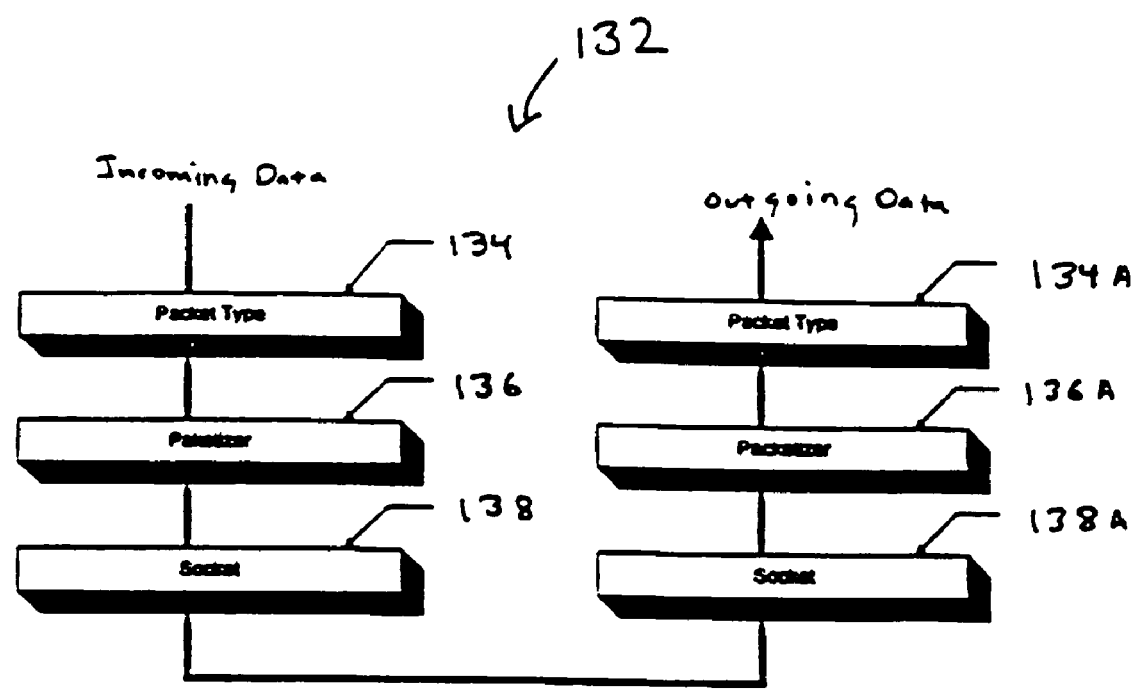
FIG. 13 illustrates the structure of the software plugs of the system of FIG. 11.

In order to provide module interchangeability and ease of use, software plugs 132A-n are provided in between each of the modules. Software plugs 132A-n provide connectivity and safe transport of data from one process space to another regardless of whether that process space resides on the same machine or another. In order to perform this function, the data proceeds down through three layers of the source socket and up again through the destination socket. Referring to FIG. 13, a software plug 132 has three layers: packet type 134, packetizer 136, and socket 138. The process flows as follows: The application fills packet type 134 with the appropriate data. The data is then serialized at packetizer 136, meaning that the data elements are strung together into a stream. Once streamed the data is framed into 512 Byte segments, assigned a message number and segment number and transferred to socket 138 for transmission. Once transmitted the process is the opposite at the receiving side. Socket 138A receives the frame which is passed to packetizer 136A where it is reassembled. Once assembled the stream is deserialized and the elements are again populated into structure 134A for use by the application.

Software plugs 132A-n allow for standardization of objects and allow the programmer to select the communication system used based on line quality. In other words, sockets 138, 138A may or may not include error checking, depending on the connection type that is used. For instance, if two modules are resident on the same hardware platform, sockets 138, 138A may not employ error checking because line quality is assumed to be good. On the other hand, where the modules are located on two separate platforms and the potential for line degradation exists, error checking may be introduced at a level corresponding to the difficulty anticipated with the line quality.

Figure 14:
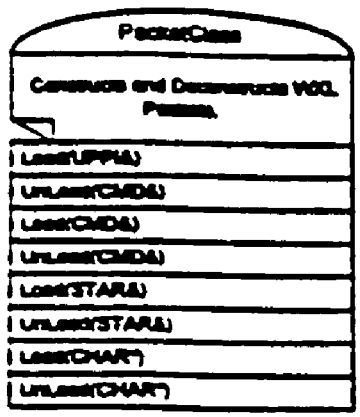
FIG. 14 is a functional object map of the packet classes of the system of FIG. 11.
Figure 14:
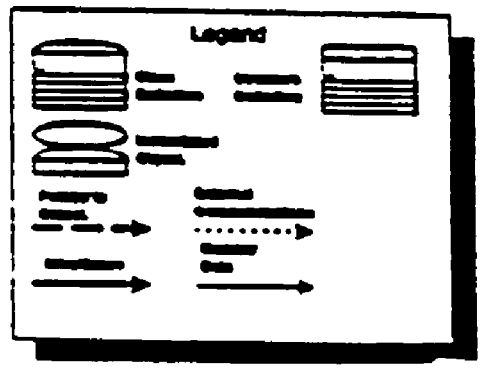
Figure 14:
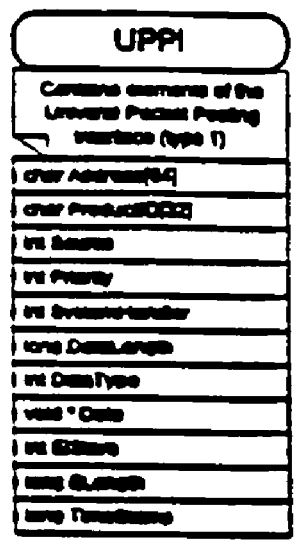
Figure 14:
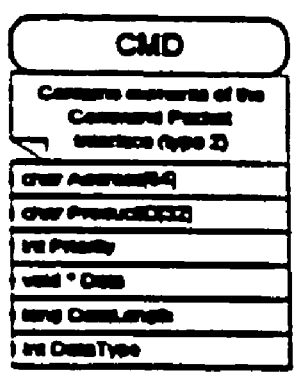
Figure 14:
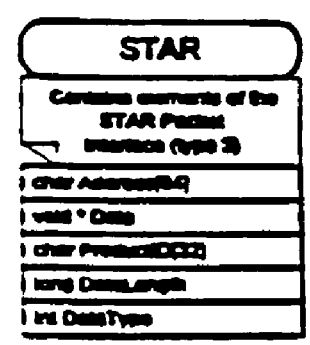

Data in system 9 are stored in a structure or packet type. As illustrated in FIG. 14, three structures are defined for system 9:

The Universal Product Posting Structure. This structure contains the data and addressing information required to package data from external sources for use with system 9.

The Command Structure. This structure contains the blocks of data that make up files transferred to receiving unit 14 via virtual channels.

The STAR Structure. This structure contains the format for data as it is moved between modules making up receiving unit 14.

Each module in system 9 is based on a common module. This module called "appclass" contains all behavior common to the modules. The common functionalities are:

Signal Handling

Error/Even Handling

Configuration Files

Basic Module Format

Console Communications

Figure 15:
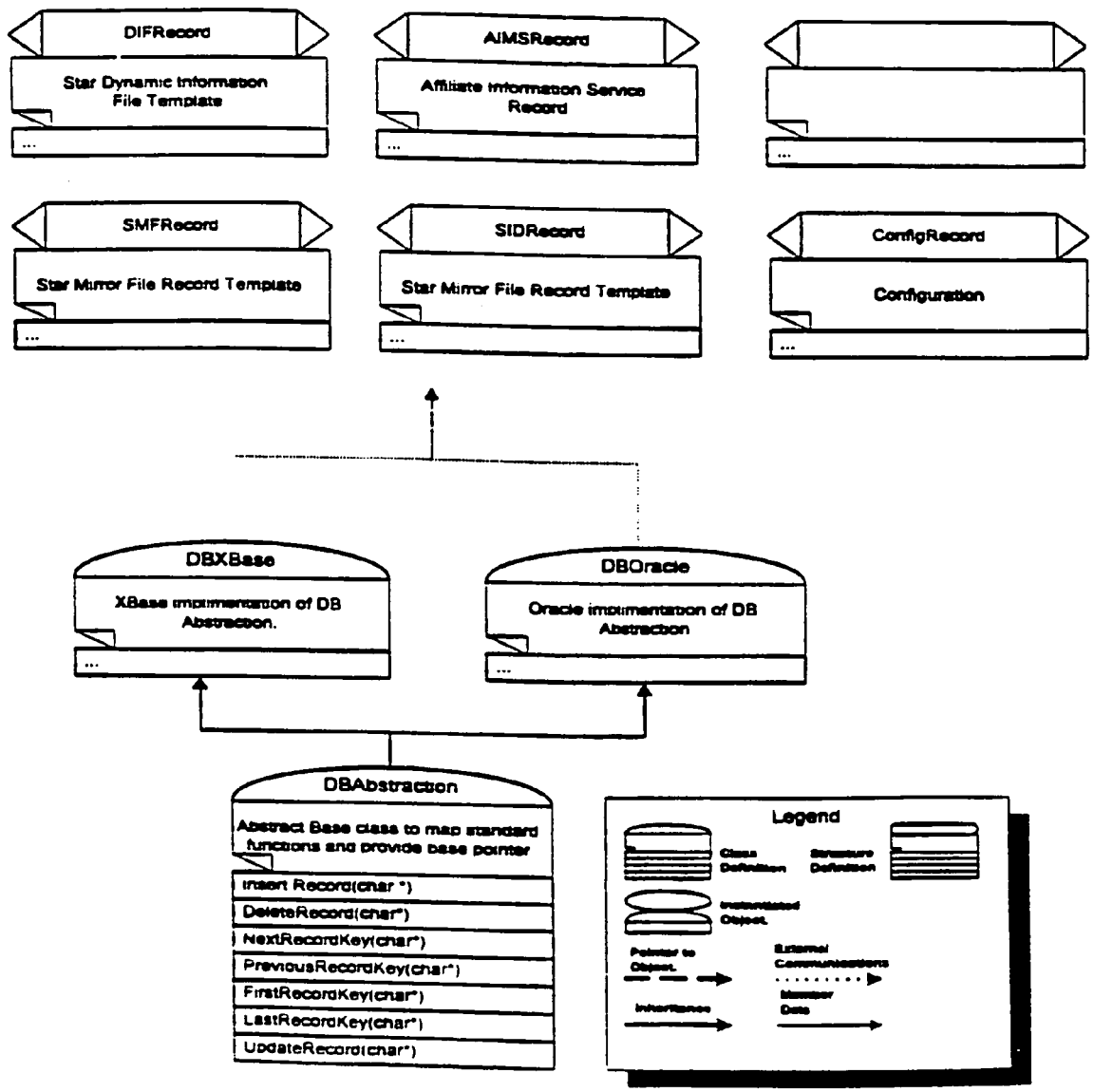
FIG. 15 is a functional object map illustrating the data base abstraction definitions of the system FIG. 11.
Figure 16:
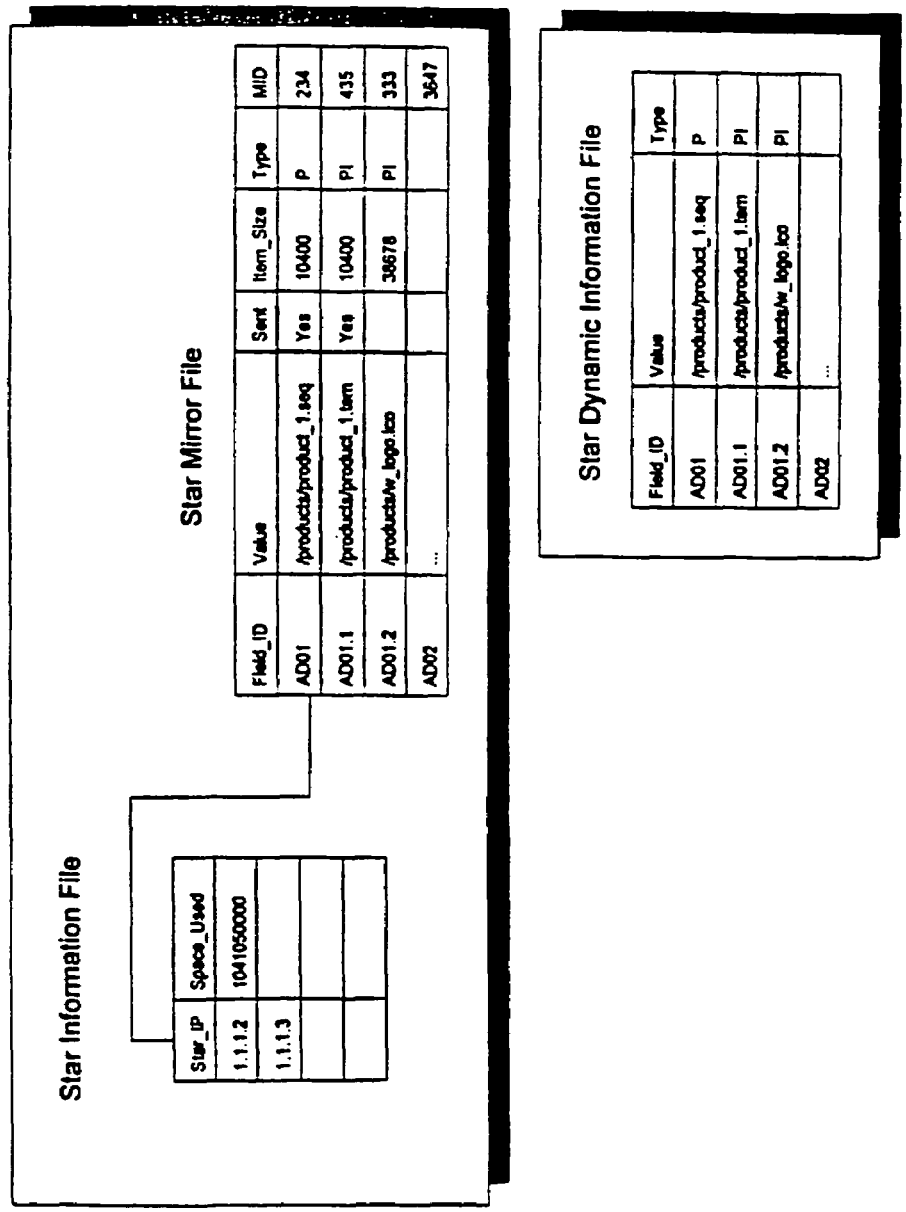
FIGS. 16A and 16A illustrate the dynamic information strategy employed by the system of FIG. 11.
Figure 16A:
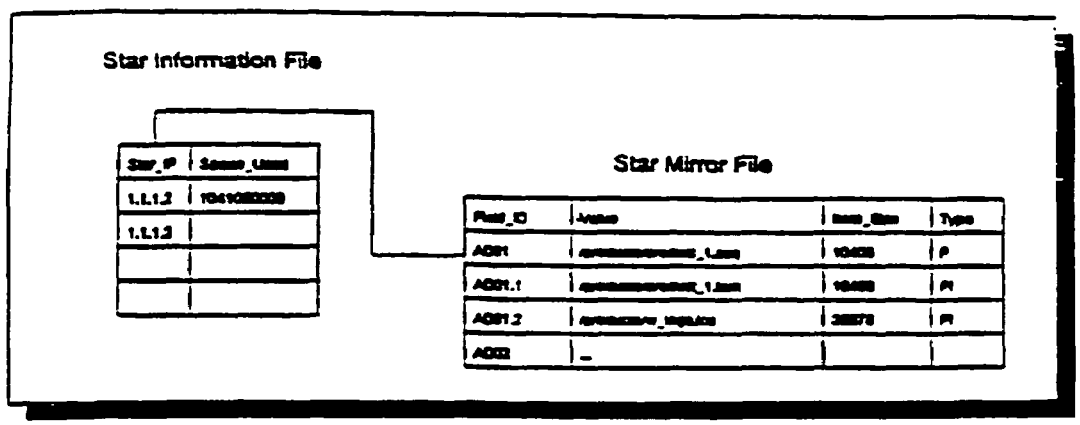
Figure 16A:
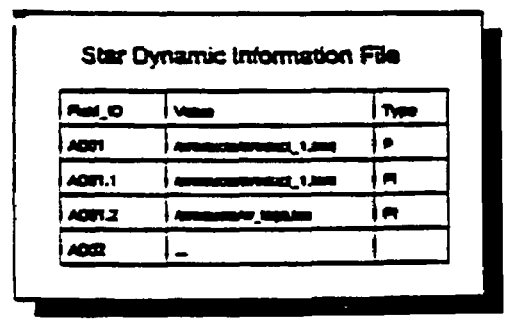
Figure 17:
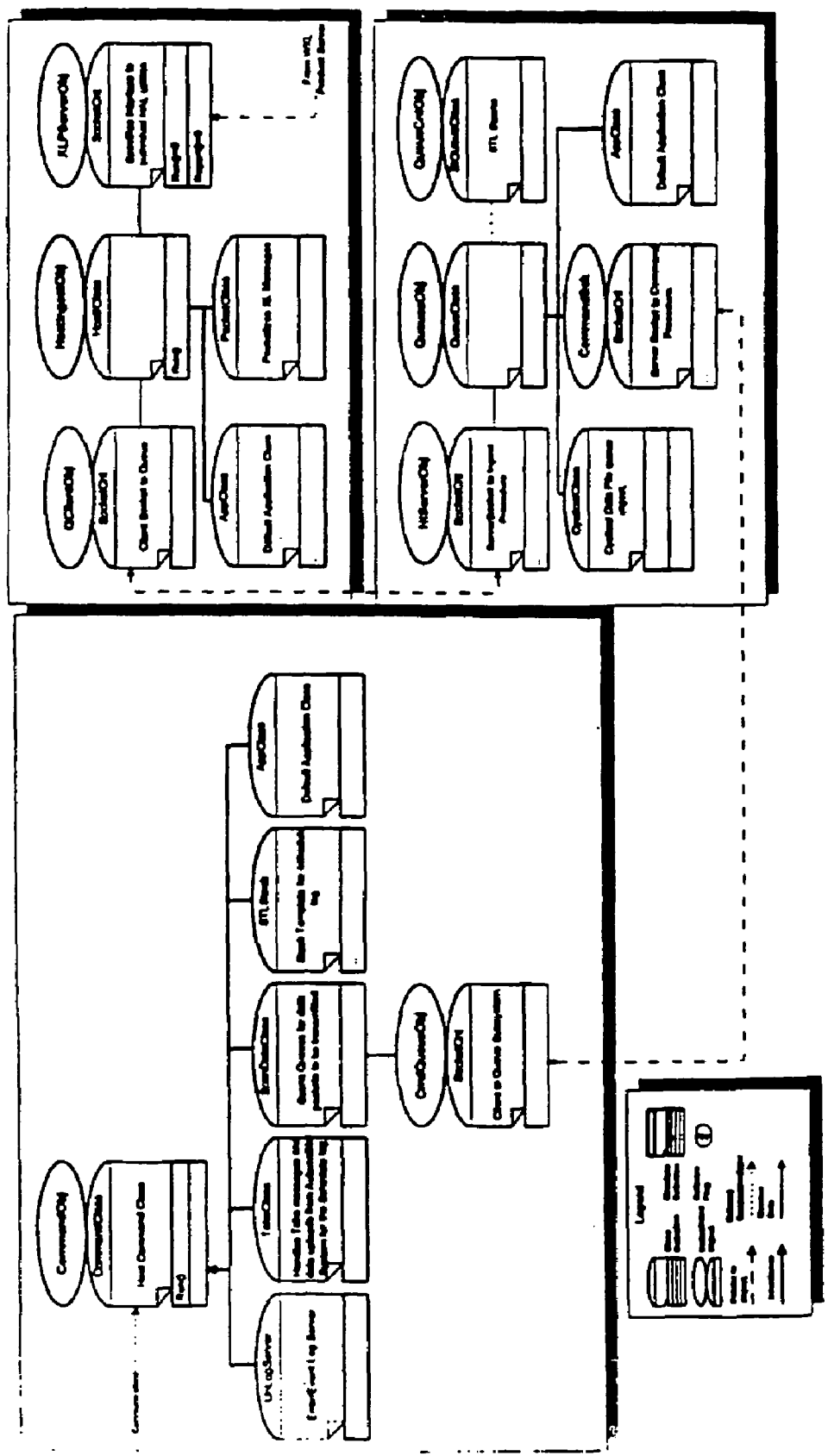
FIG. 17 is a functional object map of the host of FIG. 11.

System 9 is designed to be immune to underlying data bases. FIG. 15 defines the data base abstraction classes for system 9. The following file records are used in system 9:

Receiving Unit 14 Dynamic Information File Record (See FIGS. 16-16A).

Receiving Unit 14 Mirror File Record

Receiving Unit 14 ID File Record

De-Queue Accumulation File Record

Each module in system 9 contains a configuration record. There is only one configuration data base and one record for that data base, although the fields of the record are redefined for each module. The following tables illustrate the configuration records used in system 9:

US Met Tabular Ingest Configuration Record

| Element Name | Type | Description |
| --- | --- | --- |
| Wind Chill | char | Wind Chill |
| Moon Phase 1 | int | Index phrase/icon list |
| Sea Condition | int | Phrase list index |

Product Posing Module Configuration Record

| Element Name | Type | Description |
| --- | --- | --- |
| IngestPort | int | Port Number for Ingest Server Port. |
| RequesterPort | int | Port Number for Requester Server Port |

Host Request Module Configuration Record

| Element Name | Type | Description |
| --- | --- | --- |
| ProductPostingClientPort | int | Port Number for the product Posting Port. |
| QueueClientPort | int | Port Number for Queue Server Port. |

Queue Server Module Configuration Record

| Element Name | Type | Description |
| --- | --- | --- |
| RequesterServerPort | int | Port Number for the Host Requester |
| CommandServerPort | int | Port Number for Command. |
| PriorityQueue | int | Number of priority queues for this implementation |

Command Module Configuration Record

| Element Name | Type | Description |
| --- | --- | --- |
| QueueClientPort | int | Port Number for the Queue Server |
| ComandServerPort | int | Port Number for DeQueue |

De-Queue Module Configuration Record

| Element Name | Type | Description |
| --- | --- | --- |
| RequesterServerPort | int | Port Number for the product Posting Port. |
| CommandServerPort | int | Port Number for Queue Server Port. |

CAM Module Configuration Record

| Element Name | Type | Description |
| --- | --- | --- |
| RequesterServerPort | int | Port Number for the product Posting Port. |
| CommandServerPort | int | Port Number for Queue Server Port. |
|  | int |  |

Figure 11B:
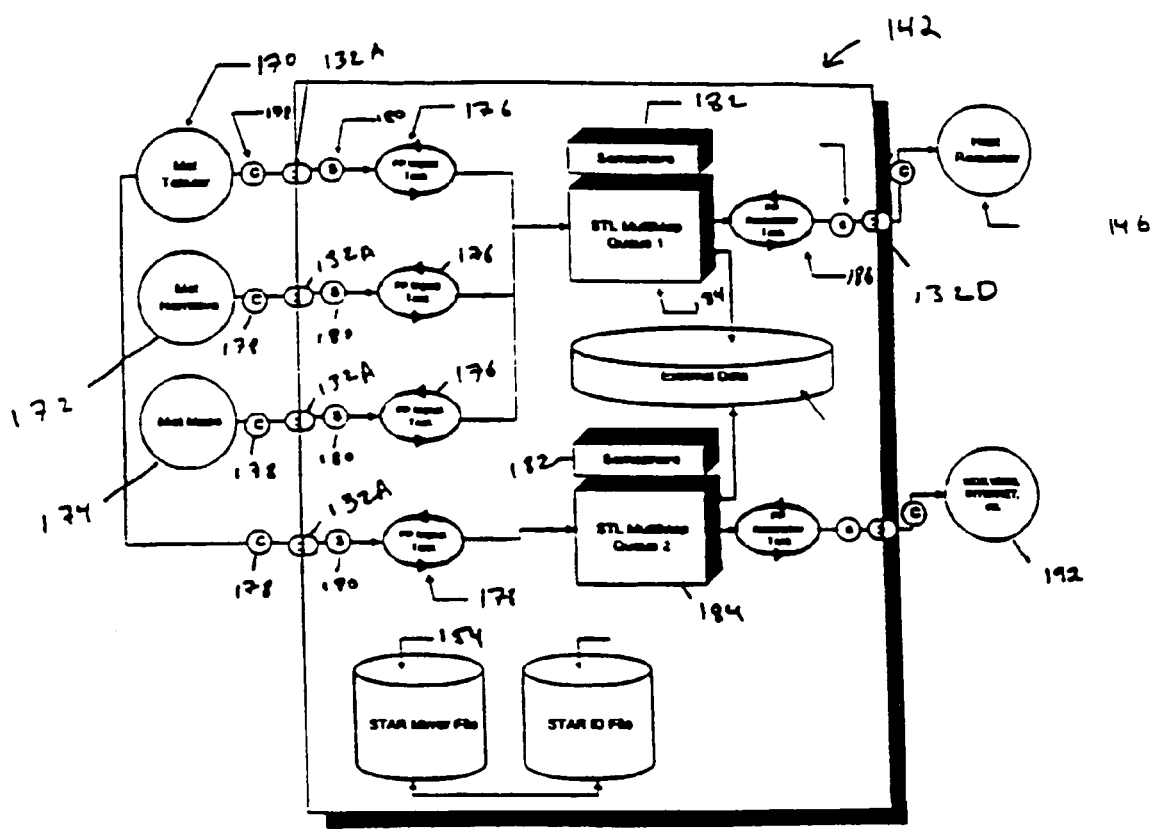
FIG. 11B is a structural object map illustrating the relationship between the components of and the flow of data through the product posting module of FIG. 11.
Figure 11:
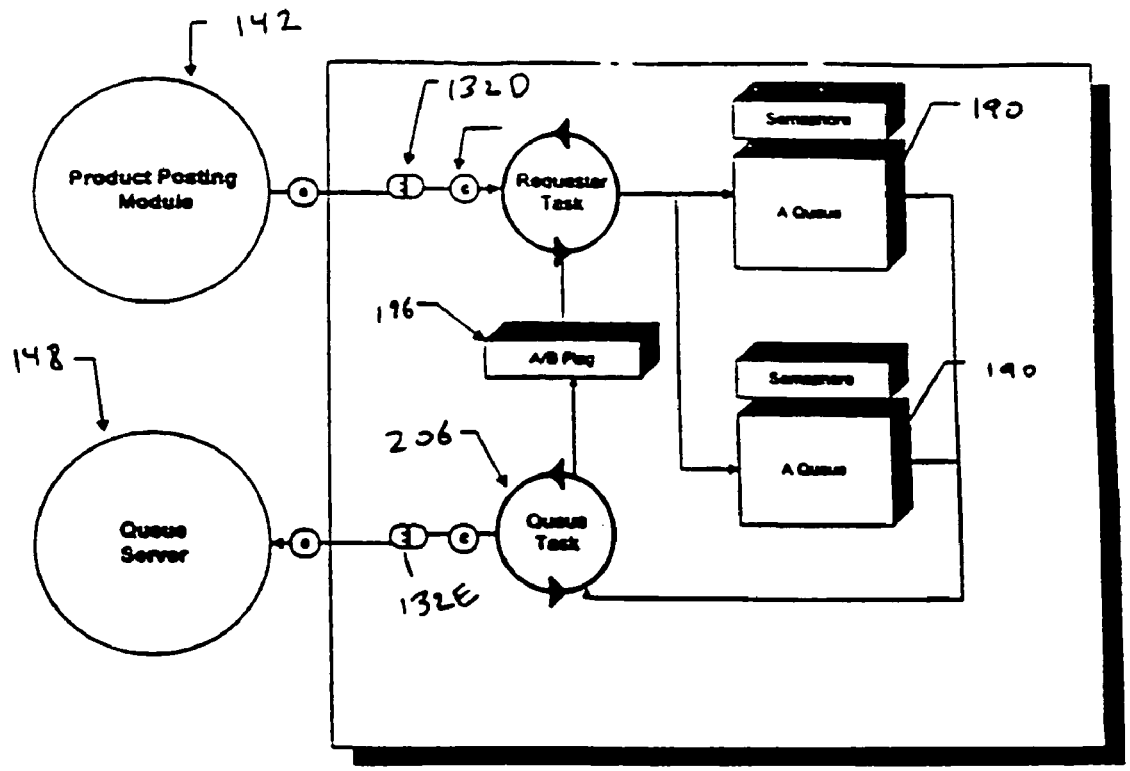
Figure 11:
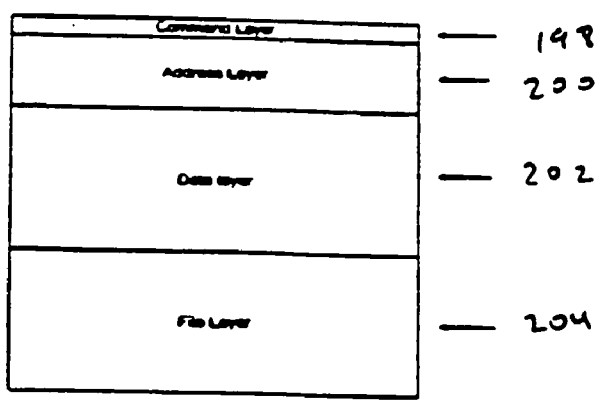
Figure 11:
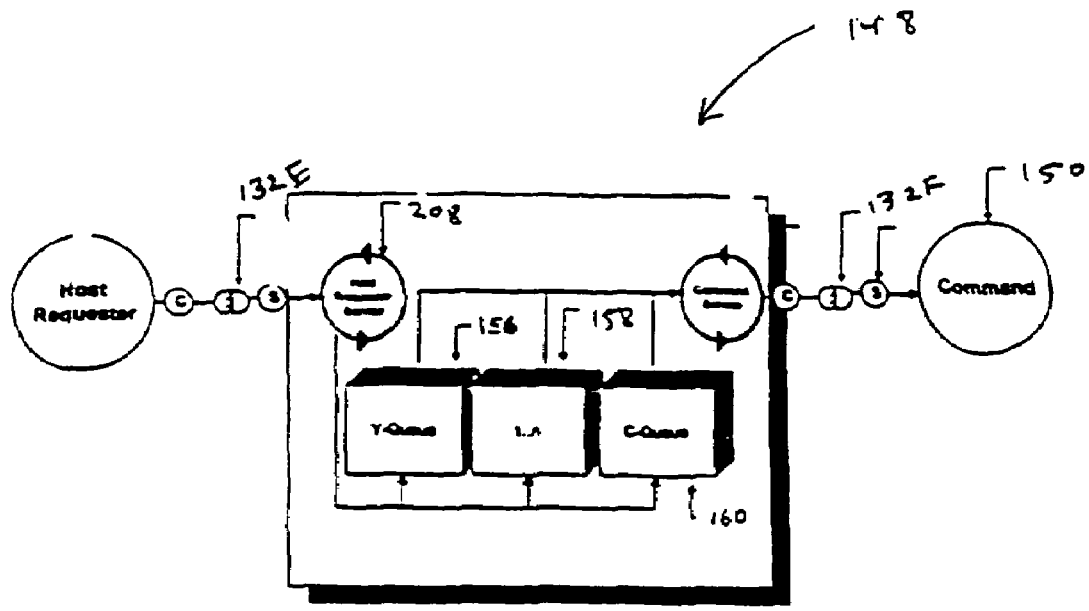
Figure 11:
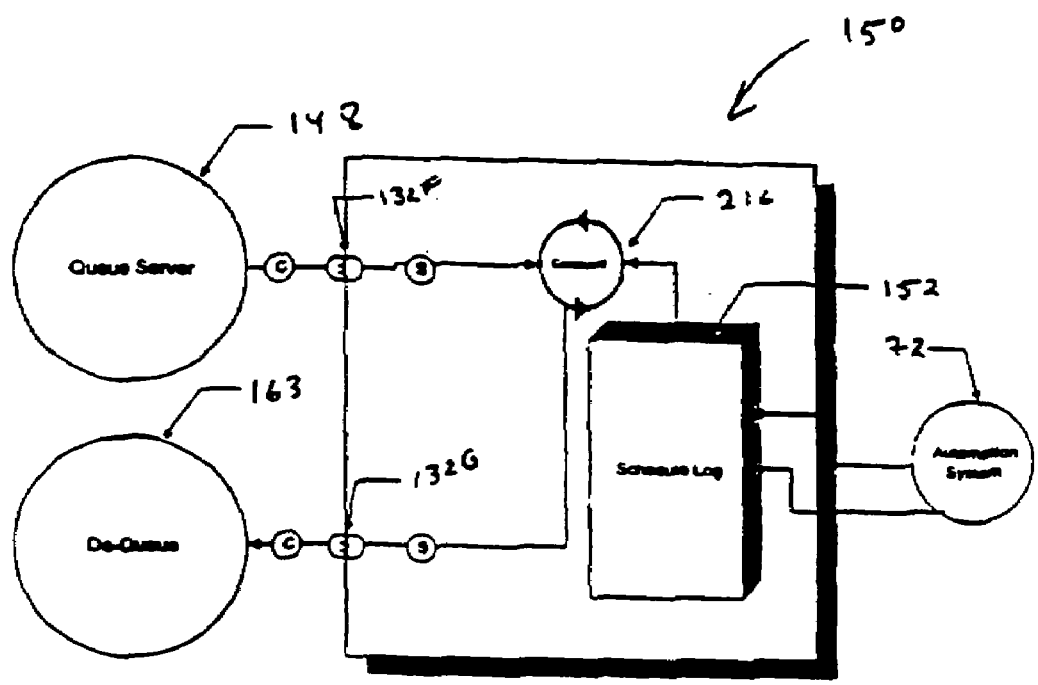
Figure 11:
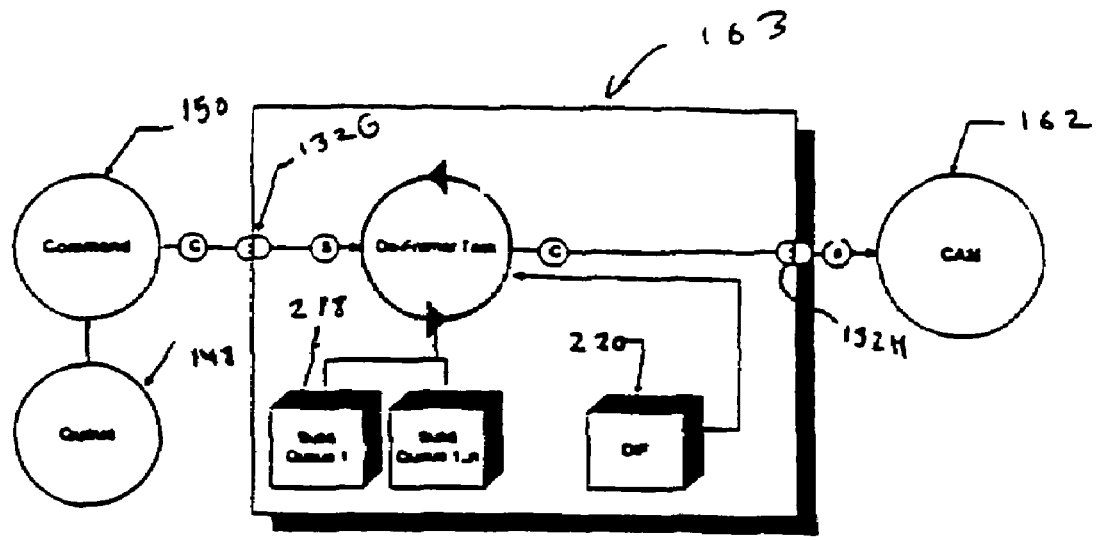
Figure 11:
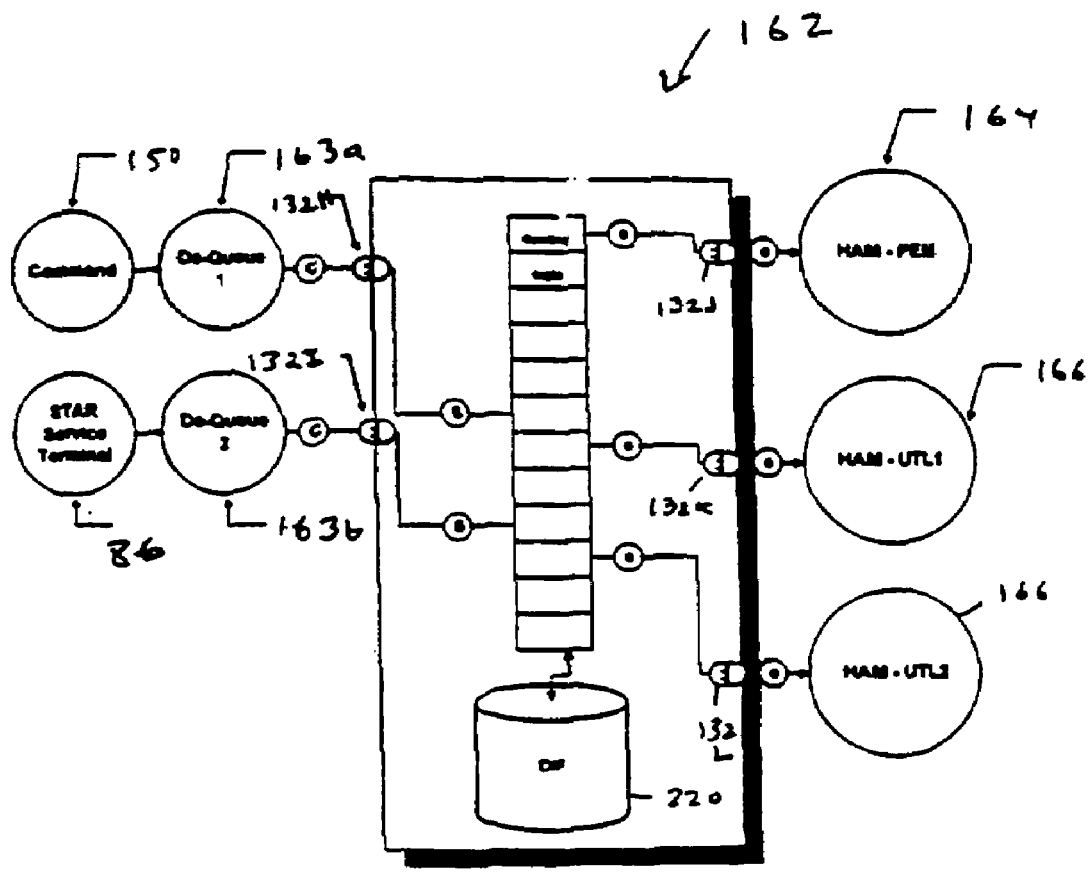
Figure 18:
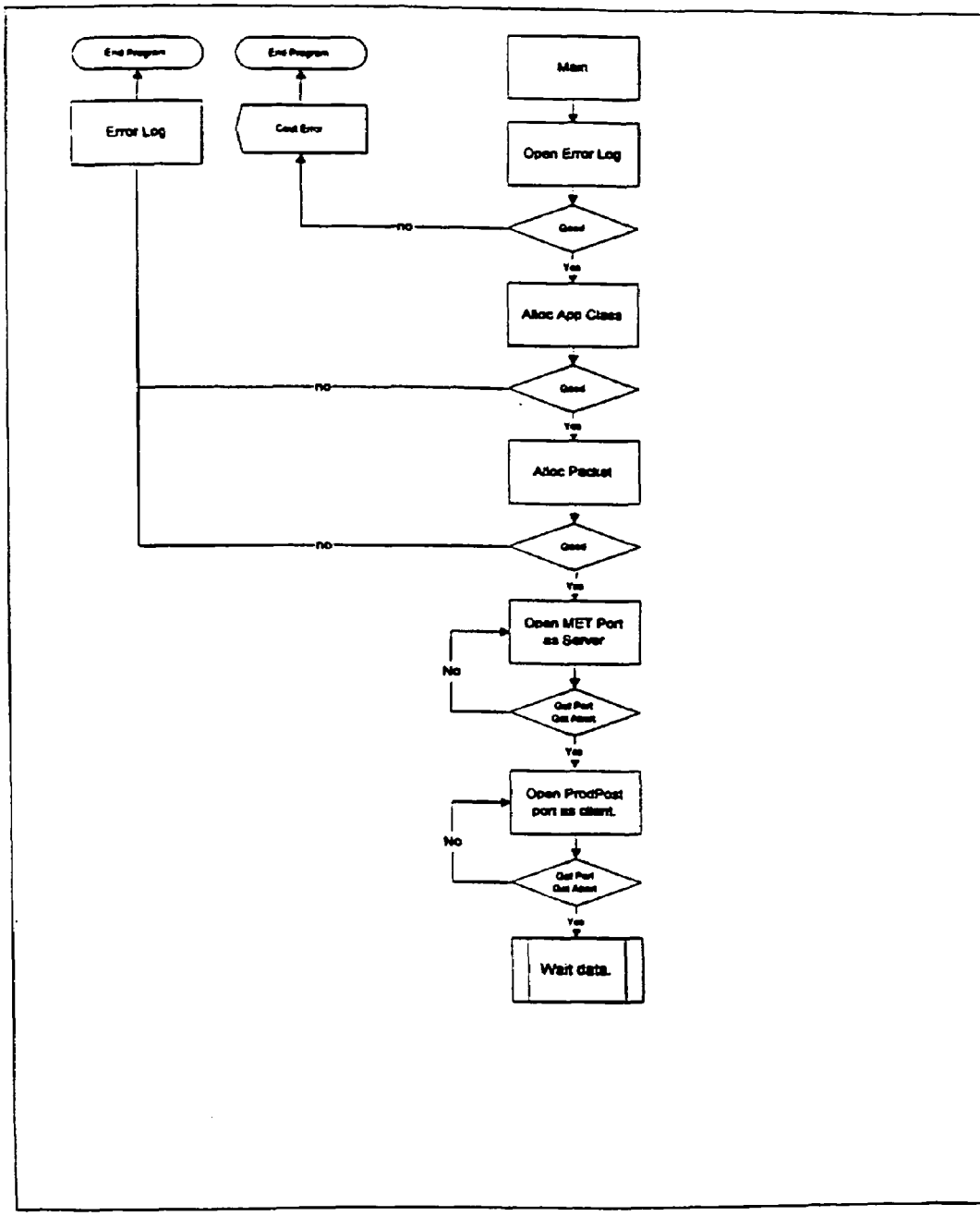
FIG. 18 is a flowchart showing the flow of information through the ingesters of FIG. 11.

Product Server and Host: As shown in FIGS. 11 through 11B, data is received by product server 76. The data flow begins at the ingesters 140. The entry point into system 9 is ingester 140. Ingesters 140 provide an interface to the outside world for posting products of all types, converting them from their raw format into a Universal Product Posting Structure. FIG. 18 illustrates the flow of information through ingesters 140.

Ingesters 140 acquire the data and construct a data packet in a predetermined formats, such as the Product Development Management System (PDMS) format. The PDMS packet includes the data itself and other information about the data such as the address, the data length, the address length, the systems to which the information is to be posted, the priority of the data and the expiration date of the data.

The PDMS packets are then forwarded to product posting module 142. Here the data is held in various lists, each list being dedicated to one or more modules which acquire the data, such as host 52, an Internet device, or other systems 192 that might be interested in the data.

Figure 19:
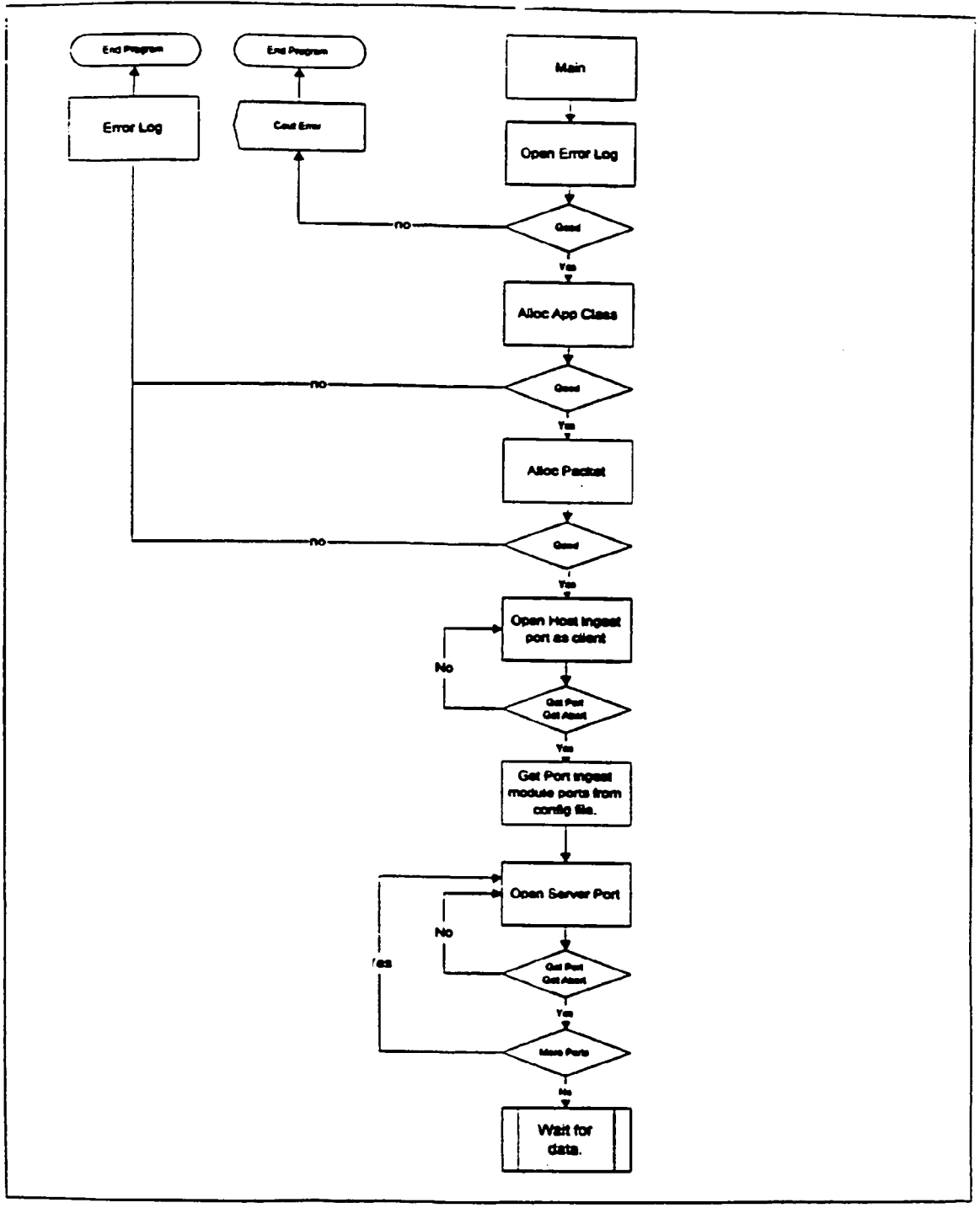
FIG. 19 is a flowchart showing the flow of information through the product posting module of FIG. 1.

As illustrated in FIGS. 11B and 19, product posting module 142 provides input into a dedicated queue from multiple sources of product data. For example US, meteorological data can originate in tabular 170, narrative 172, or map 174 file form. Each ingester 140 must package the product into a Universal Product Posting Structure and then must post that data to a single product posting queue 184 which is dedicated to a data requester, such as host 146, internet 192, etc.

The product posting process starts at the source of data, such as tabular 170, narrative 172, and maps 174. Assigned to each ingester 140 is an ingest task 176 within product posting module 142. Both ingest processes and ingest tasks 176 have configuration information indicating their Port ID's. Ingest tasks 176 have a client 178 to server 180 relationship with the ingest processes through software plugs 132A-B. A server socket simply means the UNIX port is owned and managed by the module and that multiple clients can attach to that port. The module connecting to the port is termed the client.

Ingest task 176 accepts data packaged as PDMS construct. The PDMS structure is defined in the table below.

| Element Name | Type | Description |
| --- | --- | --- |
| Source | int | Indicates the target queue number. |
| Priority | int | Indicates the priority. |
| Address | char* | Recipient STAR address. |
| AddressLength | int | Length of address data plus terminating NULL |
| Data | unsigned char* | Product data |
| DataLength | int | Length of data |
| ERStoreFlag | int | Indicates whether data is internally stored (T_ISTORE) stored externally from the packet (T_ESTORE) or stored remotely (T_RSTORE) |
| ERStoreLength | double | Length of externally or remotely stored data |
| EffectFlag | int | Data size has an effect of the total hard disk capacity of the receiving STAR, EFFECT_NOSIZE, EFFECT_SIZE |
| MessageNumber | long | Message Number |
| MessageExpiration | long | Time at which the message expires. |
| CompressionFlag | int | Can data be compressed |
| Segment ID | long | Segment for E_STORE transfers |

Source indicates the queue to which the product will be posted. The priority flag indicates the priority of the packet. These packets eventually are posted to a priority queue. Address contains the full select statement and addresses of receiving units 14 to which the data is targeted. Address length is the length of the address data. Data contains the data of the product. This can be one of two things, actual data or a pointer to remote or external data.

After blocking on a semaphore 182 for shared memory access, the packet is posted to queue 184. Ingester task 176 must accumulate the total data posted to queue 184 in order to track the total data in queue 184 at any one time.

Before the packet and its data can be posted to queue 184, ingester task 176 must do a look up in mirror file 154 and calculate the amount of space required by the data. Some data on receiving unit 14 is pre-allocated and therefore has no effect on the overall disk space. In this case the Effect flag is set to EFFECT_NOSIZE. If the size of the data must be calculated the flag is set to EFFECT_SIZE. If the calculation is made and does indicate the data does not fit on receiving unit 14 an error message must be posted and the packet thrown away.

Queue 184 is a Standard Template Library Multimap class. This class was chosen for the following reasons:
It allows Key and Data both to be stored.
It allows ordered insertions without sorting
It allows ordered deletions without sorting Once packets are posted, the higher priority packets "float" to the top of queue 184 since the multi-map is keyed to priority.

The architecture on the requester side is very similar. Product posting requester task 186 is assigned to host requester process 146. They are connected by software plug 132D where product posting module 142 acts as a server and host module 146 acts as a client. As shown in FIGS. 11B-C, the differences are two fold. First, host module 146 sends a ready message when it is ready for the product posting requester task 186 to forward the first packet off the queue. Second, only one product posting requester task 186 runs per queue 190, unlike the Ingester Tasks 176 in which multiple tasks can post to one queue 184.

Product posting requester task 186 also has the responsibility of posting a record to mirror file 154. After the packet is transmitted to host module 146 it is then written to mirror file 154. The elements required for mirror file 154 are specified in FIGS. 16-16A.

Product posting module 142 accommodates three types of data: Internally Stored (I_STORE), Externally Stored (E_STORE), and Remotely Stored (R_STORE). Because there is the potential for very large amounts of data, one of the pieces of information included in the PDMS packet is the I_STORE/E_STORE indicator. If the data packet is relatively small the data is labeled I_STORE, where the I signifies that the data portion is actually the data that is to be sent on to host 52 and eventually receiving unit 14. If the data packet is very large, it is labeled E_STORE and stored on an external server. The E indicates that the data packet is merely a pointer which indicates where the data may be found. Internally stored data, or I_STORE data, is transferred via a single packet. Since I_STORE data is limited to 2-kBytes it can be sent in one packet.

When external data, or E_STORE data, is sent the process is different. First the PDMS packet entry is sent to product posting module 142 as it would be for any I_STORE entry except for the fact that the E_STORE flag is set to E_STORE, the file name is contained in the data element and the E_STORE Length is set to E_STORE, the file name is contained in the data element and the E_STORE Length is set to the length of the file. After receiving the packet the product posting module 142 evaluates the E_STORE flag for the value E_STORE. If this flag is true then ingest task 176 expects the file to follow in 2048 byte segments.

The file is posted by absolute file name in a directory name based on queue 182. The naming convention is:
[Current Directory]/queue[Queue Number]/[File Name]

For example, a file named 091502.96t. for queue 182 one be written to:
./queue1/091502.96t.

This is usually free from text data of the size that can be accommodated by the structure. Usually text data should be limited to a configurable amount to insure that no single record eats excessive memory before it is cached to disk. Currently the system restricts internally stored data to 10,000.

Exception handling—in the event that the queues contain too much data for the system to handle, the product posting requester task 186 purges all non-priority 1 data from the queue. The determination of how much data is too much is configurable, but when this threshold is met all data excepting priority 1 data is purged from the file. Currently 20 kbytes is the maximum I_STORE data length. If a port is lost, all ports should drop into a 10 second loop looking for connectivity when a port is dropped. Any port drops should be reported to the error log.

Product posting module 142 provides more than just a universal conversion of data. It provides a standard staging area for all commands and data that must be transported through system 9 to receiving unit 14 or from one machine to another. The reason for this is that a product may contain many sub-products, all of which must be moved around in system 9 in varying degrees and transported over different communication lines. Many products may not even need to be produced before being transported. Product posting module 142 provides a central repository or central control area for items to be manipulated on their way to their final destination.

Host module 146 picks up the PDMS packet from the product posting module 142 and breaks it into two packets. The first packet is the address and the second packet is the data. This system allows receiving unit 14 to operate more efficiently. When the information gets to receiving unit 14 only the first packet is read. If the address indicates that the data is for that receiving unit, it then proceeds to store that data that follows the address. If the address is not directed to that receiving unit, it ignores all data until the next address packet arrives. This is important because it saves time that would be required for the receiving unit to parse through data. In order words, the receiving unit has only to parse, unpack or decompress the address packet to determine whether the data is directed at it. It does not need to decompress or reassemble any of the data, which may be time consuming.

Figure 20:
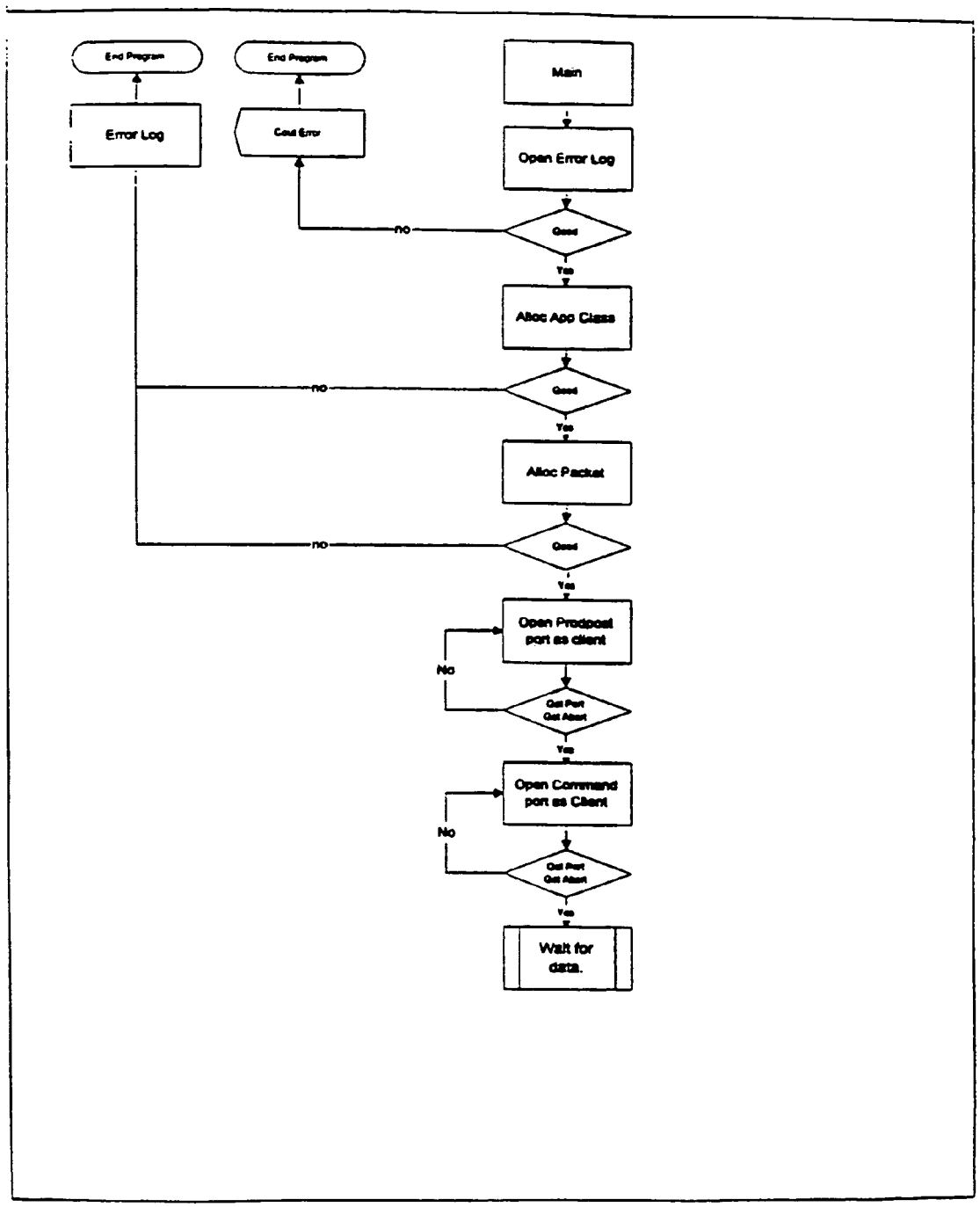
FIG. 20 is a flowchart showing the flow of information through the host module of FIG. 11.

As illustrated in FIGS. 11C and 20, host requester module 146 requests data from the product posting module 142 and processes into command packets to be transferred to queue server 148 to be staged for transmission.

Upon start up, host requester 146 opens its configured port for access to an assigned product posting queue 184. This relationship is over a software plug 132D with the product posting module 142 acting as a server and the host requester 146 acting as client. The system allows multiple requesters to be attached to product posting module 142, but each requester is married to one product posting queue 184.

Host requester 146 receives a new message for processing. Processing in this case means compressing the data of the message, if necessary, and breaking the message into chunks of command data.

Requester task 194 requests data from its assigned queue 184 in product posting module 142 which is fed to it via a PDMS structure. Requester task 194 uses two work areas in memory so that one can be loaded while the other is unloaded. First the requester task checks an 'A/B' flag 196 to determine which queue 190 is open and then begins to chunk data and load it into that queue 190.

In order to understand the chunking process, the anatomy of a command message is illustrated in FIG. 11D. Generally any message is broken into four layers—command layer 198, address layer 200, data layer 202, and optional file layer 204. Any message always contain address 200 and data 202 layer. Additionally if a file download is being executed it can be appended to the bottom. First, command layer 198 is written and the LayerFlag element is set to 0. Then the address 200 is broken into chunks of 512 bytes incrementing the segment number and setting the LayerFlag to 1 to indicate the address layer. Next the data is evaluated for length. If it exceeds 5 k Bytes, it first compresses the chunked into 512 Byte segments. Again the segment number is incremented appropriately and the LayerFlag is set to 2. If a file transfer is called for the host requester 146 sends a "RF" message loaded in the Data element of the PDMS structure. The table below defines the structure of the command data packets.

| Element Name | Type | Description |
| --- | --- | --- |
| MessageNumber | long | The message number |
| Data/Message Length | long | Length of data/Total number of segments in the message if LayerFlag = o. |
| LayerFlag | BYTE | 0 = Command Layer<br>1 = Address Layer<br>2 = Data Layer<br>3 = File Layer |
| Segment Number | long | The number of this 512 Byte segment |
| Data | void | Data of the message |
| Priority | int* | Massage Priority |

Once complete the Requester Service task sets the A/B flag to B and signals the queue server task 206 that data is ready on queue 190. Queue server task 206 transfers the message chunk by chunk to the queue server module 148 which in turn populates it into a queue based on priority.

Once the PDMS packet is properly formatted, it is forwarded to the queue server 148 which has several queues, one for each class of data. Queue server 148 acts as a priority based staging ground for processed data ready for transmission to receiving units 14. FIG. 11E illustrates the function of queue server 148.

Host module 146 establishes a client relationship via software plug 132E with queue server 148 where host requester service 208 thread requests pre-processed data chunks from host requester 146. Host module 146 provides messages as a series of command packets which are loaded into a queue.

There are three types of queues: Y-queue 156, C-queue 160, and one or more priority queues 158. C-queue 160 is the command queue. Messages in C-queue 160 go out immediately after reception. The priority number of C-queue 160 is one. Y-queue 156 is the cyclical queue. Y-queue contains 156 the lowest priority data but the most critical data where lossiness is concerned. Files whose integrity must be guaranteed are placed in Y-queue 156 in order to be transmitted a number of times thus insuring error free transfer. Y-Queue 156 priority number is two hundred and fifty six. Priority queues 158 accept a configurable number of priority messages. When configuring the system, the number of priority queues 158 can be specified. The number of priority queues 158 specified is for error checking only, since any message entering queue server 148 that has an unallocated priority queue will, after checking the number of queues, automatically have one allocated for it. Command module 150 provides the transmission of commands and data. This is its only function since this function is so important and susceptible to delay.

Figure 21:
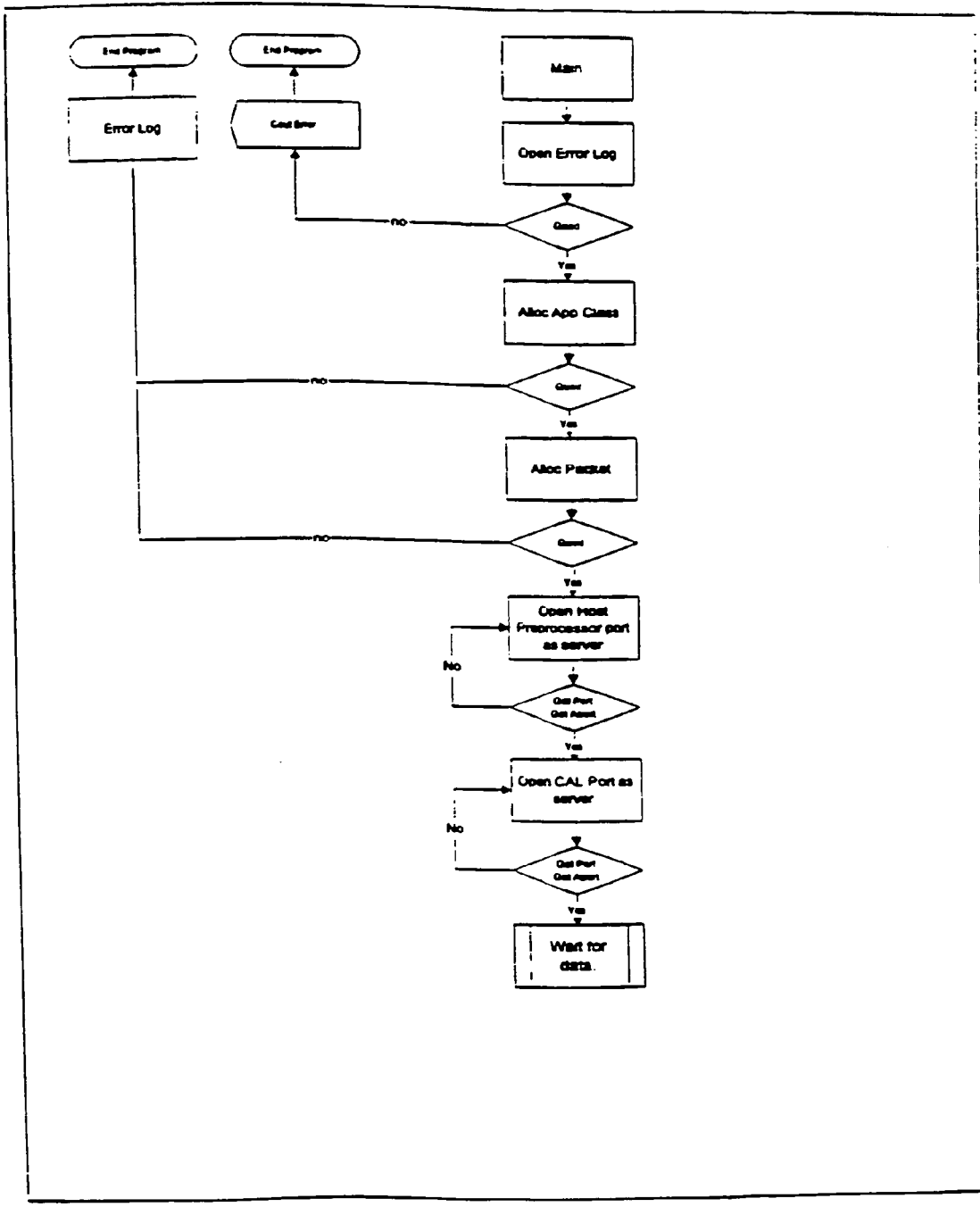
FIG. 21 is a flow chart showing the flow of information through the command module of FIG. 11.
Figure 22:
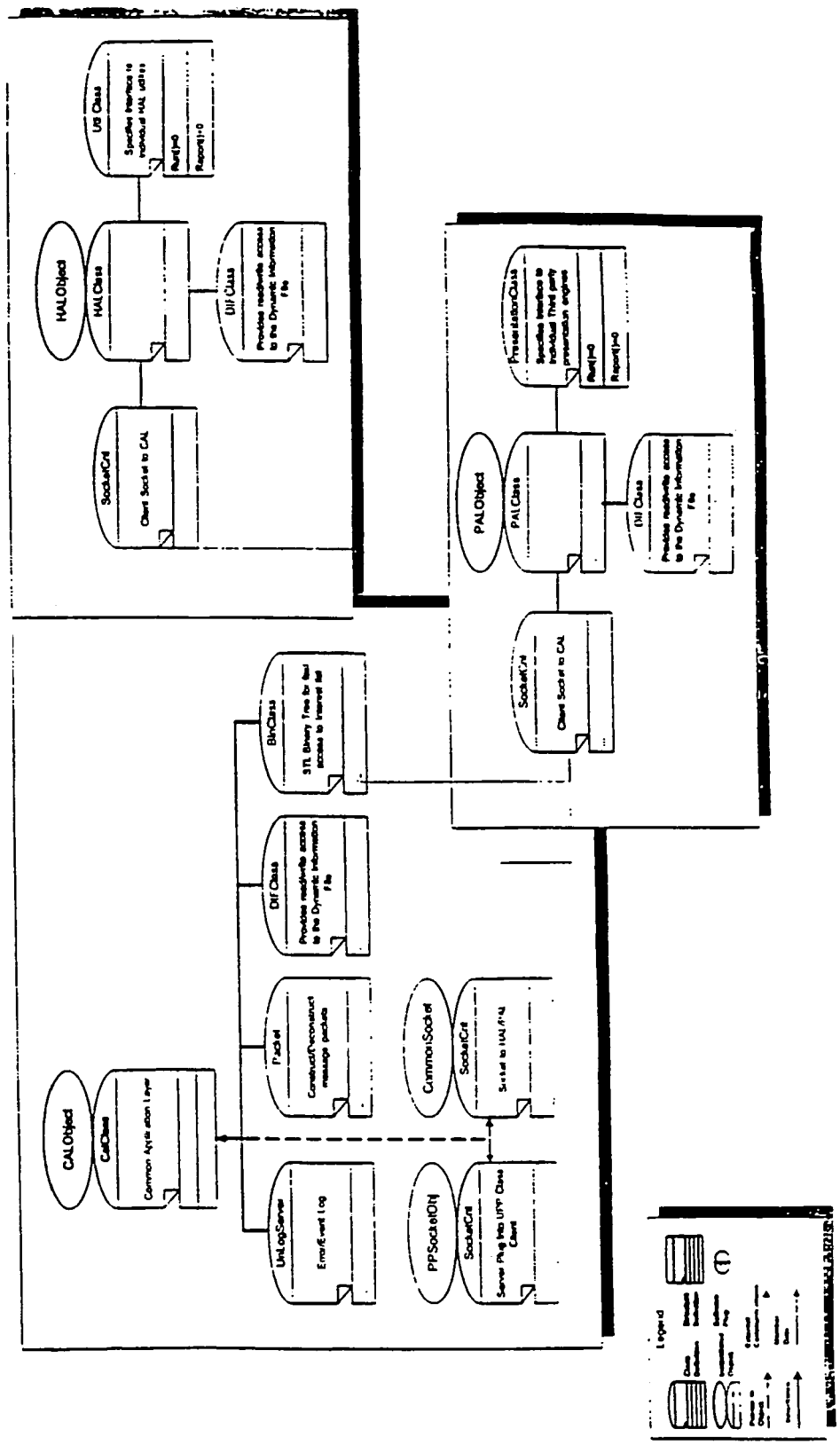
FIG. 22 is a functional object map showing the structure and classes of the receiving unit of FIG. 11.
Figure 23:
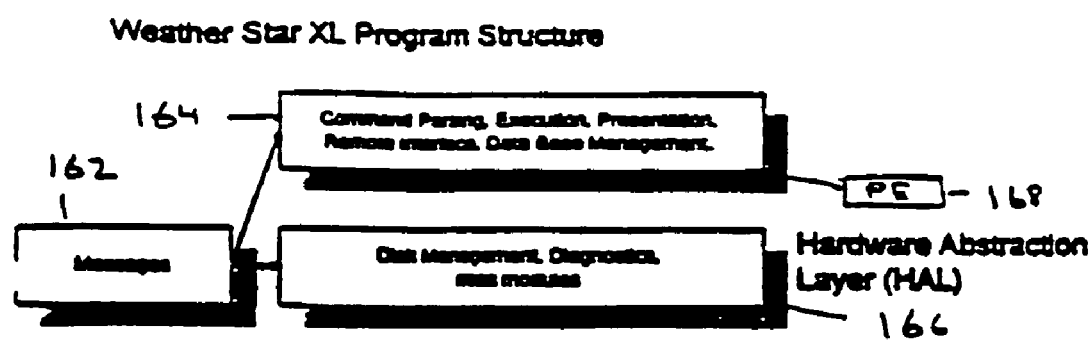
FIG. 23 illustrates the software structure of the receiving unit of FIG. 11
Figure 24:
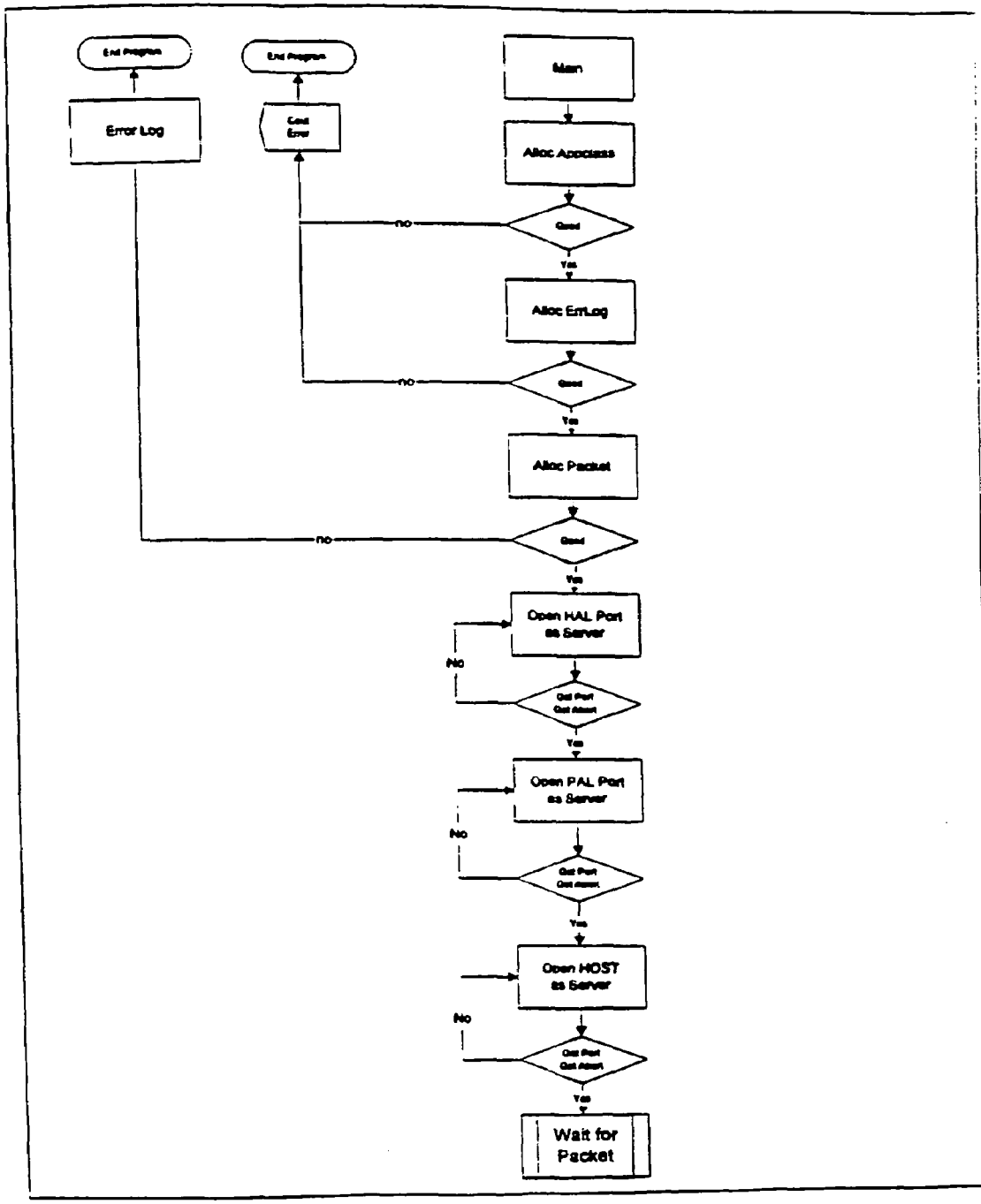
FIG. 24 is a flowchart showing the flow of information through the common application layer of the receiving unit FIG. 11.
Figure 25:
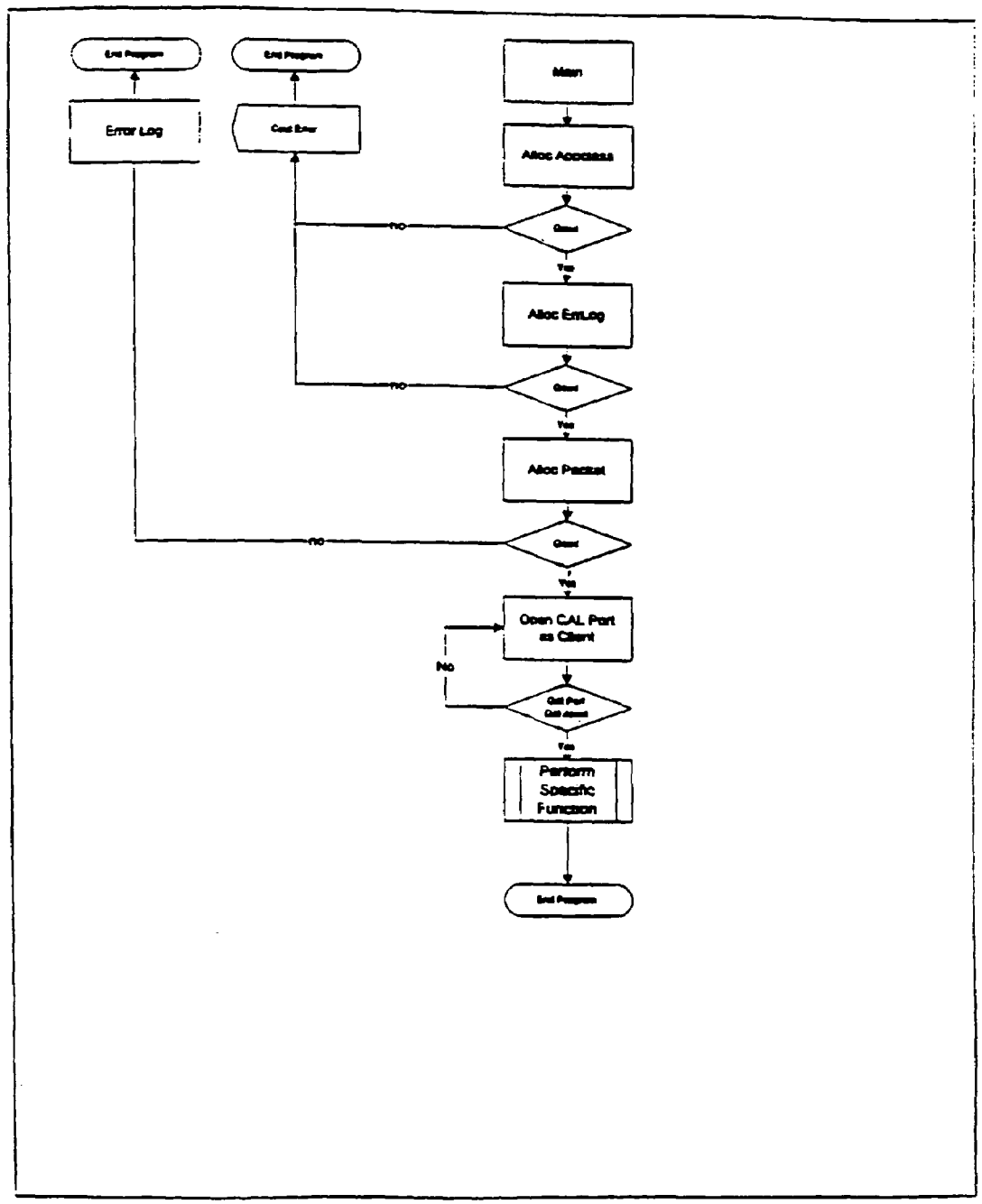
FIG. 25 is a flowchart showing the flow of information through the hardware abstraction layer of the receiving unit FIG. 11.
Figure 26:
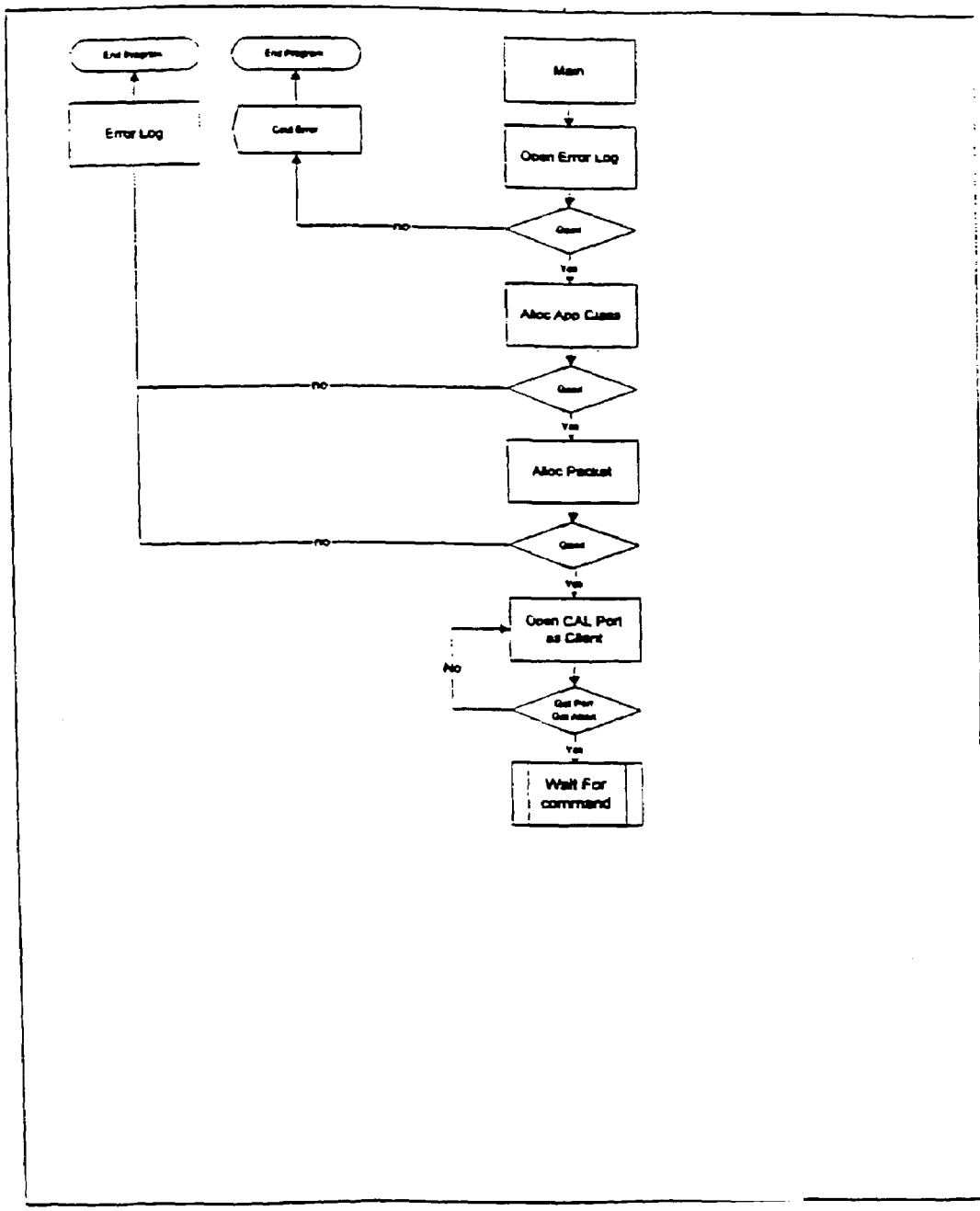
FIG. 26 is a flowchart showing the flow of information through the presentation application layer of the receiving unit FIG. 11.

As illustrated in FIGS. 11E and 21, command module 150 requests data from queue server 148 and transmits that data to De-Queue module 163 at receiving unit 14. Queue server 148 feeds data to command based on a strict algorithm that insists that high priority data be cleared from queues 156, 158, 160 as a soon as possible. As discussed in previous sections, commands can be sent through the system originating at any ingester 176. The problem that arises is the delays imposed by processing. Some commands require close coordination between broadcast production where delays of a less than a second are unacceptable. Therefore the command task 216 is assigned a schedule log 152 so that real time commands can be sent in the quickest and most efficient manner possible.

Schedule log 152 accepts commands from the automation system 72. These commands are be executed at a particular time by impulse from a binary switch, also originating from the automation system 72. Command task 216 attempts to anticipate the next command and insures that it has time to clear the passageway to de-queue module 163. Command module 150 sends commands from schedule log 152 and data from product posting module 142 to receiving unit 14 whose address it gets from the High Speed Addressing File. Command module 150 periodically runs through queues 156, 158, 160 and selects the data according to a set of rules.

Product data comes in three forms based on priority. The first source of product data is weather warnings and command data that must go out to receiving unit 14 immediately—this is C-queue 160 data. The second form of data is standard Meteorological Data which, although perishable, can get to receiving unit 14 in a reasonable amount of time after C-queue 160 data have been sent. This is priority queue 158 data. The final form of data that must get to receiving unit 14 is programs, products, and configuration information, i.e., Y-queue 156 data. Cyclical data is sent over and over again in predetermined cycles to insure that it gets to receiving unit 14 in error-free form.

Host module 146 increments through the product posting module 142 on product server 76 looking for priority queue and Y-queue data. If these types of products are found and they are in excess of 4096 bytes then they are compressed. The compressed product is broken into transfer packets of 512 KB with a 64-bit CRC appended. Each transfer packet is then written to the appropriate queue priority data is written to priority queue 158 and cyclical data is written to Y-queue 156.

An exception is made for C-queue data. If this type of data is written to the product posting module 142, a trigger is called that interrupts host module 146 and passes it a physical record address. Host 52 records its current increment and goes directly to the record in question and posts it to C-queue 160. Once posted, the host module 146 continues at the previous increment.

An example of C-queue data is priority command data, i.e., data that must be sent to receiving unit 14 in real-time. Real-item command data originates in MDS 68 and is written to the Schedule Log 152. Also, any changes to log 152 are posted to host 52 from MDS 68. Schedule log is a queue with a pointer to the current command. An additional General Purposes interface (+5,0 volts) originating at automation system 72 goes high in order to signal host 52 to increment its command pointer and to send the command located there.

Command module 150 responds immediately to the signaling of real-time priority data by the movement of the schedule command pointer. Command module 150 checks the priority command queue 160 for information. If there is information there, it sends it until queue 160 is empty.

When the priority command queue 160 is empty and schedule log 150 is not incremented, command module 150 checks priority queue 158. If there is information there it sends a packet, then checks for new priority command data. If no priority command data exists and no schedule interrupt is received, then command module 150 sends the next packet. It essentially sends a packet of data and checks important priorities, if no important priorities exist it sends another. Finally, the monitoring of cyclic queue 158 works-essentially the same as with priority queue 158 except that if any priorities exist above it they are completely serviced before any cyclical packets are sent.

Command module 150 also looks to schedule log 152 of MDS 68 and, if it notes that an event is coming which will consume transmission bandwidth, it may decide to hold the transmission until impending events are over.

There is also a receiving unit mirror file 154 located on the product posting module 142. This file records everything that is sent out to each individual receiving unit 14. It then creates a log of everything that is resident on the receiving unit 14. This is necessary because the transmission system is an open loop which does not allow the system to know whether the data transmitted was ever actual received by the receiving unit 14. Thus, receiving unit mirror file 154 allows the system to know how full the hard drive of the receiving unit 14 is and if necessary send, delete or erase commands to eliminate stale data so that new data may be transmitted.

The Receiving Unit: As illustrated in FIGS. 11G-H and 22-26, receiving unit 14 has four modules—de-queue module 163, command application module (CAM) 162, presentation application layer (PAL) 164 and hardware abstraction layer (HAL) 166.

As illustrated in FIG. 11G, de-queue module 163 is the entry point for the system into receiving unit 14. It deals with receiving, interpreting, assembling, and transferring packets from and to command module 150 and CAM 162.

Data messages are broken into command packets and stored in queue server 148. Packets: are stored in a single message made up of two sections. The front section is the address section and the back section is the data section. Each section is broken up further into frames of 512 bytes. Since command module 152 can remove packets with different message numbers from the queue 148 it is possible for the packets to be interleaved. De-queue module 163 therefore performs two tasks—first it resolves-addresses for receiving unit 14 and then reassembles packets into messages if they are targeted a the particular receiving unit 14.

Command module 150 opens a client relationship through a software plug 132G with de-queue server 163. The message top is reassembled in a disk queue and evaluated for true by look up in the Interest List section of Dynamic Information File 220. If the message is intended for the particular receiving unit 14 then de-queue module 163 continues to build the message from the incoming packets. If the message is not intended for the particular receiving unit 14, then any received packets are discarded.

When messages are complete they are transferred to CAM 162 through software plug 132H after being converted to a data packet, as illustrated in the table below. The relationship between CAM 162 and de-queue 163 is one of "Priority Request." First, CAM 162 indicates to de-queue module 163 when it is ready to receive any message by transmitting a ready string. This ready string can be of two types. The first is "RA" which means 'ready for all messages.' This indicates that CAM 162 is not extremely busy with other tasks. The other possible flag is an "RC" which indicates that CAM 162 can only receive command messages. This flag indicates that receiving unit 14 is probably in broadcast production and cannot be disturbed except for the most important information.

| Element Name | Type | Description |
| --- | --- | --- |
| Target - HAL | char*32 | Indicates the target HAL for the Message. |
| Data | void* | Data of the message. |
| Data Length | long | Length of data. |

De-queue module 162 accepts messages from command module 150 based on the top of the message which is addressing information. Addresses are evaluated in the following format:

SELECT [ALL, *] [WHERE [FieldName] [=,=>,=,!=] [FieldValue 1] [OR,AND] [Fieldvalue .n]]

The above expression simply states that the address is to select all (alternatively*) receiving units 14 that meet the certain qualifications. The SELECT ALL statement by itself has the effect of broadcasting to all receiving units 14 in the field. For example

SELECT * and

SELECT ALL would have the effect of passing the message to all receiving units 14 in the field since it would be evaluated as true.

The SELECT statement can be modified by the WHERE token to indicate that the whole statement needs to be evaluated for TRUE. The queue evaluates a FieldName for a some operation of a Field Value. This means that the FieldName can be evaluated as being equal to, less than, more than, or not equal to, a particular value. For example,

SELECT * WHERE MOUNTAIN_COUNTRY=1 would pass in receiving units that had the Field Name MOUNTAIN_COUNTRY set to a value of 1. Alternatively

SELECT * WHERE MOUNTAIN_COUNTRY !=1 would pass in all receiving units 14 not containing the Field Name MOUNTAIN_COUNTRY set to a value of 1. SELECT parameters can be compound also.

As illustrated in FIG. 11H, CAM 162 provides data base updates and communications routing services for the many modules running in front and behind it. All communications traffic is routed through CAM 162.

CAM 162 accepts data and command concurrently from two sources: the standard satellite command feed from command module 150 and the service terminal 86. Each of the data feeds must interface with a separate de-queue module 163 married to the port of entry. Both attach to CAM 162 via software plugs 132H-I.

After filtering messages not intended for receiving unit 14, de-queue converts the command data packet into a receiving unit data packet and forwards it to CAM 162.

CAM 162 responds to a limited number of commands. One set of commands tells CAM 162 to send the data to presentation application layer (PAL) 164. The second set of commands tells CAM 162 to send the information to hardware abstraction layer (HAL) 166. PAL 164 is a interface between CAM 162 and presentation engine 168. This allows presentation engine 168 to be replaced easily.

HAL 166 consists of multiple layers which are small modules that can be written and run from CAM 162, including such desirable utilities as defragmentation routines, debugging routines, etc. By using many layers, each utility or function is a small piece of software. This allows new software to be easily downloaded to receiving unit 14 over the transmission signal.

CAM 162 contains application modules that provide most of the external activity of receiving unit. Commands enter the system in the SQL Command Query language subset.

Figures 27, 28:
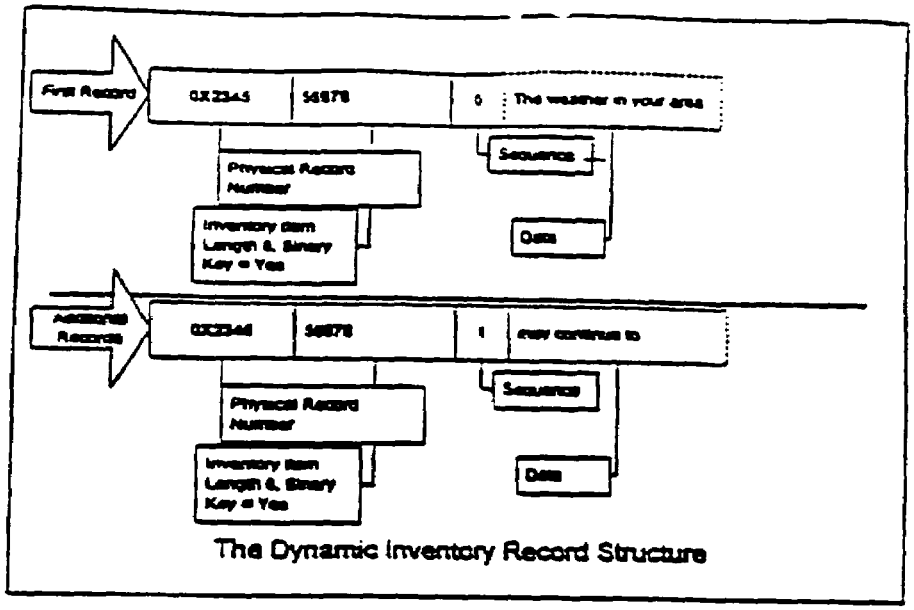
FIG. 27 illustrates the file structure of the receiving unit of FIG. 11.
FIG. 28 illustrate the fields used in data records used by the system of FIG. 11.

Configuration and weather data entering the system is written to the Dynamic Inventory File (DIF) 220, illustrated in FIG. 27. Also as the information in this file is need for other processes, chiefly the presentation software, this layer provides access to the DIF 220 records. It is from CAM 162 that the third party presentation layer is called, executed, and monitored.

HAL 166 contains kernel modules that service and monitor the system at the lowest level. The following modules make up this layer:

Disk Management. Due to the heavy disk usage in multimedia applications and to the fact that receiving unit 14 is an automated system the hard disks must be constantly monitored and serviced. This module monitors for disk problems in low periods and de-fragments in off times.

Diagnostics. Very low level diagnostics must be performed periodically and during certain events, such as the completion of a presentation to ensure that memory leaks have not occurred. This module performs diagnostics in an automated fashion or can be called by the Service Daemon for remote debugging.

The Dynamic Inventory, All information involved in the system is reduced to a dynamic inventory. The configuration of DIF 220 is a flat indexed database which consists of two fields—Field Identifier and the Field Value. The relationship between receiving unit 14 and product server 76 is shown in FIGS. 16-16A.

The Field ID and Data are meaningful depending on the context of the data. FIG. 29 illustrates the data types used by system 9. If the data is program data, the Field ID represent a running program. If the data is weather data, the Field ID represents display data. This strategy provides an extremely simple design where the DIF 220 requires only three fields per record. This file allows the entry of new data types facilitating the expansion of product and weather data that can be presented and the number of effects that can be displayed. The format of DIF 220 is illustrated in FIG. 27.

The parent record contains four fields as listed in FIG. 28 and the child contains one field listed in FIG. 28, as well. The above design accommodates variable length data by breaking the data into segments. This approach has a further advantage in that DIF 220 can be pre-allocated on the receiving unit 14 hard disk Other modules may be included in HAL 166 as appropriate or necessary for the operation of receiving unit 14.

Each receiving unit contains elements of configuration data. This data mostly tells receiving unit 14 who it is, where it is, and how its hardware and software should be configured. Data is transmitted to all receiving units 14 during any command transmission. In order to direct specific data to a receiving unit 14 the address must be contained in the message. If the receiving unit "sees" its address in the message packet, it "knows" that the message is directed to it.

DIF 220 keeps track of local conditions, forecasts, and notifications. This information is combined with the effects to produce the local weather products. DIF 220 keeps a list of utilities that are HAL 166-compatible. A record of where the program is located is required to execute these programs remotely.

Receiving unit 14 must ingest all of the data being transmitted by host 52. First the incoming packets must be disassembled then the address header is resolved by a lookup in the DIF interest list to determine whether the message is intended for the specific receiving unit 14. This activity takes place at CAM 162. If CAM 162 determines that the message is intended for it, it then determines what type of data it is being sent by evaluating the SQL command. There are only three possible commands—one to set data values, one to execute a HAL/PAL command, and one to execute a CAM command—just as in any SQL language.

The format for setting a value is as follows assuming there is a DIF element named CURRENT_TEMP

CURRENT_TEMP=70

CAM 162 determines that the message is intended to set a value in the DIF file. CAM 162 first looks for the DIF FID. If the DIF FID is not present it then adds it and sets the value. If the DIF FID is present it simply replaces the current value.

The format for executing any command is as follows.

CALL AD01

Assuming that AD01 is a product (say current observations). CAM 162 looks up AD01 in the DIF file with the understanding that since it was preceded by a CALL statement that either a command is sent to the HAL 166 or PAL 164. Once found, CAM 162 evaluates the data type. If the data type is a program the command is sent to HAL 166. If the data type is product then the command is sent to PAL.

Some commands CAM 162 recognizes immediately. Those commands are listed in FIG. 30. Commands set to HAL 166 are intended to executed custom modules. These modules are developed on top of a common platform so that they can report information back to CAM 162 via software plug 132.

Commands sent to PAL 164 are intended to either CAM 162, a product or to execute one of the limited commands PAL 164 understands. Commands PAL 164 understands are shown in FIG. 31. PAL 164 executes products by passing the command to the Presentation Engine 168. Any monitoring information that must be passed back to CAM 162 is sent via queue-socket 132.

Although the foregoing is provided for purposes of illustrating, explaining and describing embodiments of the present invention, modifications and adaptations to these embodiments will be apparent to those skilled in the art and may be made without departing from the scope or spirit of the invention.

What is claimed is:

1. A method of providing programming to a plurality of information distribution centers, comprising:

transmitting a national programming product to the information distribution centers;

transmitting a command to a first one of the information distribution centers that indicates availability of a first local programming product;

transmitting the first local programming product;

transmitting a command to a second one of the information distribution centers that indicates availability of a second local programming product;

transmitting the second local programming product; and transmitting scheduling information to the information distribution centers, wherein the scheduling information indicates a time period for providing national programming and a time period for providing local programming, wherein the first information distribution center creates local programming using the first local programming product and the second information distribution center creates local programming using the second local programming product, and wherein the first local programming product includes weather information and wherein the first information distribution center analyzes the weather information and creates local programming based on the weather information and a playlist for the local programming based on the weather information.

2. A method of providing programming to a plurality of information distribution centers, comprising:

transmitting a national programming product to the information distribution centers;

transmitting a command to a first one of the information distribution centers that indicates availability of a first local programming product;

transmitting the first local programming product;

transmitting a command to a second one of the information distribution centers that indicates availability of a second local programming product;

transmitting the second local programming product; and transmitting scheduling information to the information distribution centers, wherein the scheduling information indicates a time period for providing national programming and a time period for providing local programming, wherein the first information distribution center creates local programming using the first local programming product and the second information distribution center creates local programming using the second local programming product, and wherein the first local programming product includes weather information and wherein the first information distribution center analyzes the weather information and creates local programming based on the weather information and selects an advertisement based on the weather information.

* * * * *